United States Patent
Turner

(10) Patent No.: US 9,505,203 B2
(45) Date of Patent: Nov. 29, 2016

(54) METHOD OF MANUFACTURING DYE-SUBLIMATION PRINTED ELEMENTS

(75) Inventor: David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 160 days.

(21) Appl. No.: 12/956,344

(22) Filed: Nov. 30, 2010

(65) Prior Publication Data

US 2012/0132355 A1 May 31, 2012

(51) Int. Cl.
*B44C 1/17* (2006.01)
*B29C 65/02* (2006.01)
(Continued)

(52) U.S. Cl.
CPC ............ *B32B 38/145* (2013.01); *A41D 13/015* (2013.01); *D06P 5/004* (2013.01); *D06P 5/005* (2013.01); *D06Q 1/00* (2013.01); *D06Q 1/08* (2013.01); *D06Q 1/12* (2013.01)

(58) Field of Classification Search
CPC .... A41D 13/015; A41D 13/05; A41D 31/02; B44C 1/1712; B44C 1/1716; B32B 38/145; B32B 37/26; B32B 27/00; B32B 28/14; B32B 5/06; B32B 5/18; B32B 5/24; B32B 5/02; B32B 5/32; B32B 5/26; D06P 5/003; D06P 5/004; D06P 5/005; B42D 15/10; G09F 3/02; G09F 3/10; B29C 65/18; B29C 65/02; B29C 66/004; B41M 5/0082; B41M 5/035; B41M 5/382; B41M 5/38235; B41M 5/38257; B41M 5/40; B41M 7/00; B41M 3/12; B41M 5/0256; B41M 7/0027; Y10T 156/1089; Y10T 156/1092; Y10T 156/1093; Y10T 156/1744; Y10T 156/1749; A61L 15/425; A61L 15/24; A61N 1/14; A61B 6/0442; A47C 31/004; A47C 7/18; A62B 17/006; A62D 5/00; D06Q 1/00; D06Q 1/08; D06Q 1/12

USPC ............ 156/240, 277; 442/30, 56, 221, 223, 442/315, 370, 372
See application file for complete search history.

(56) References Cited

U.S. PATENT DOCUMENTS

| 921,352 A | 5/1909 | Blaker et al. |
| 1,282,411 A | 10/1918 | Golembiowski |

(Continued)

FOREIGN PATENT DOCUMENTS

| CA | 892301 | 2/1972 |
| CA | 2063814 | 1/1991 |

(Continued)

OTHER PUBLICATIONS

U.S. Appl. No. 12/709,819, filed Feb. 22, 2010 (currently pending but not published).

(Continued)

*Primary Examiner* — Sing P Chan
(74) *Attorney, Agent, or Firm* — Shook, Hardy & Bacon L.L.P.

(57) ABSTRACT

A method for manufacturing printed elements may include receiving an order including data representing indicia. The indicia may be printed by dye-sublimation on a surface of a first material. The first material may be positioned adjacent to and between a second material and a dye retention layer. The first material, the second material, and the dye retention layer may be compressed and heated, such as in a thermal-bonding process, to secure the first material to the second material. Custom-ordered indicia of a comparatively high quality may thereby be imparted to printed elements, including textile elements, cushioning elements, and a variety of other products.

17 Claims, 35 Drawing Sheets

(51) Int. Cl.

| | |
|---|---|
| B32B 37/04 | (2006.01) |
| B32B 37/06 | (2006.01) |
| B32B 37/26 | (2006.01) |
| B32B 38/14 | (2006.01) |
| B32B 38/00 | (2006.01) |
| A41D 13/015 | (2006.01) |
| D06P 5/28 | (2006.01) |
| D06Q 1/00 | (2006.01) |
| D06Q 1/08 | (2006.01) |
| D06Q 1/12 | (2006.01) |

(56) References Cited

U.S. PATENT DOCUMENTS

| | | | |
|---|---|---|---|
| 1,910,810 A | 5/1933 | Nash | |
| 1,924,677 A | 8/1933 | Cadgéne | |
| 2,266,886 A | 8/1940 | McCoy | |
| 2,569,398 A | 9/1951 | Burd et al. | |
| 2,723,214 A | 11/1955 | Meyer | |
| 2,738,834 A | 3/1956 | Jaffe et al. | |
| 2,751,609 A | 6/1956 | Oesterling et al. | |
| 2,785,739 A | 3/1957 | McGregor, Jr. et al. | |
| 3,012,926 A | 12/1961 | Wintermute et al. | |
| 3,020,186 A | 2/1962 | Lawrence | |
| 3,119,904 A | 1/1964 | Anson | |
| 3,137,746 A | 6/1964 | Seymour et al. | |
| 3,233,885 A | 2/1966 | Propst | |
| 3,258,800 A | 7/1966 | Robinsky | |
| 3,285,768 A | 11/1966 | Habib | |
| 3,293,671 A | 12/1966 | Griffin | |
| 3,305,423 A | 2/1967 | Le Masson | |
| 3,371,584 A | 3/1968 | Zernov | |
| 3,404,406 A | 10/1968 | Balliet | |
| 3,441,638 A | 4/1969 | Patchell et al. | |
| 3,444,732 A * | 5/1969 | McKinley et al. | 73/150 A |
| 3,465,364 A | 9/1969 | Edelson | |
| 3,471,865 A | 10/1969 | Molitoris | |
| 3,512,190 A | 5/1970 | Buff | |
| 3,515,625 A | 6/1970 | Sedlak et al. | |
| 3,647,505 A | 3/1972 | Bjorn-Larsen | |
| 3,679,263 A | 7/1972 | Cadiou | |
| 3,722,355 A | 3/1973 | King | |
| 3,746,602 A | 7/1973 | Caroli et al. | |
| 3,746,605 A | 7/1973 | Dillon et al. | |
| 3,775,526 A | 11/1973 | Gilmore | |
| 3,832,265 A | 8/1974 | Denommee | |
| 3,867,238 A | 2/1975 | Johannsen | |
| 3,867,239 A | 2/1975 | Alesi et al. | |
| 3,877,353 A | 4/1975 | Smith et al. | |
| 3,882,547 A | 5/1975 | Morgan | |
| 3,911,185 A | 10/1975 | Wright, Jr. | |
| 3,914,487 A | 10/1975 | Azoulay | |
| 3,922,329 A | 11/1975 | Kim et al. | |
| 3,977,406 A | 8/1976 | Roth | |
| 4,023,213 A | 5/1977 | Rovani | |
| 4,059,471 A * | 11/1977 | Haigh | 156/244.27 |
| 4,126,177 A | 11/1978 | Smith et al. | |
| 4,136,222 A | 1/1979 | Jonnes | |
| 4,138,283 A | 2/1979 | Hanusa | |
| 4,181,554 A | 1/1980 | Rich | |
| 4,190,417 A * | 2/1980 | Prochaska et al. | 8/436 |
| 4,190,696 A | 2/1980 | Hart et al. | |
| 4,197,342 A | 4/1980 | Bethe | |
| 4,232,076 A * | 11/1980 | Stetson et al. | 428/158 |
| 4,238,190 A * | 12/1980 | Rejto | 8/471 |
| 4,249,302 A | 2/1981 | Crepeau | |
| 4,255,552 A | 3/1981 | Schollenberger et al. | |
| 4,272,850 A | 6/1981 | Rule | |
| 4,276,341 A | 6/1981 | Tanaka | |
| 4,305,716 A | 12/1981 | Nickum | |
| 4,322,858 A | 4/1982 | Douglas | |
| 4,415,622 A | 11/1983 | Kamat | |
| 4,422,183 A | 12/1983 | Landi et al. | |
| 4,440,525 A | 4/1984 | Perla | |
| 4,482,592 A | 11/1984 | Kramer | |
| 4,485,919 A | 12/1984 | Sandel | |
| 4,493,865 A | 1/1985 | Kuhlmann et al. | |
| 4,507,801 A | 4/1985 | Kavanagh et al. | |
| 4,512,037 A | 4/1985 | Vacanti | |
| 4,516,273 A | 5/1985 | Gregory et al. | |
| 4,534,354 A | 8/1985 | Bonner, Jr. et al. | |
| 4,538,301 A | 9/1985 | Sawatzki et al. | |
| 4,559,251 A | 12/1985 | Wachi | |
| 4,581,186 A | 4/1986 | Larson | |
| 4,631,221 A | 12/1986 | Disselbeck et al. | |
| 4,642,814 A | 2/1987 | Godfrey | |
| 4,646,367 A | 3/1987 | El Hassen | |
| 4,692,199 A | 9/1987 | Kozlowski et al. | |
| 4,713,854 A | 12/1987 | Graebe | |
| 4,718,214 A | 1/1988 | Waggoner | |
| 4,720,317 A * | 1/1988 | Kuroda et al. | 156/250 |
| 4,730,761 A | 3/1988 | Spano | |
| 4,734,306 A | 3/1988 | Lassiter | |
| 4,756,026 A | 7/1988 | Pierce, Jr. | |
| 4,774,724 A | 10/1988 | Sacks | |
| 4,780,167 A | 10/1988 | Hill | |
| 4,809,374 A | 3/1989 | Saviez | |
| 4,852,274 A | 8/1989 | Wilson | |
| 4,856,393 A | 8/1989 | Braddon | |
| 4,867,826 A | 9/1989 | Wayte | |
| 4,884,295 A | 12/1989 | Cox | |
| 4,964,936 A | 10/1990 | Ferro | |
| 4,982,447 A | 1/1991 | Henson | |
| 4,985,933 A | 1/1991 | Lemoine | |
| 4,989,265 A | 2/1991 | Nipper et al. | |
| 4,991,230 A | 2/1991 | Vacanti | |
| 5,007,111 A | 4/1991 | Adams | |
| 5,020,156 A | 6/1991 | Neufalfen | |
| 5,020,157 A | 6/1991 | Dyer | |
| 5,029,341 A | 7/1991 | Wingo, Jr. | |
| 5,030,501 A | 7/1991 | Colvin et al. | |
| 5,042,318 A | 8/1991 | Franz | |
| 5,052,053 A | 10/1991 | Peart et al. | |
| 5,060,313 A | 10/1991 | Neuhalfen | |
| 5,071,698 A | 12/1991 | Scheerder et al. | |
| 5,129,295 A | 7/1992 | Geffros et al. | |
| 5,160,785 A | 11/1992 | Davidson, Jr. | |
| 5,168,576 A | 12/1992 | Krent et al. | |
| 5,188,879 A | 2/1993 | Hill et al. | |
| 5,214,797 A | 6/1993 | Tisdale | |
| 5,232,762 A | 8/1993 | Ruby | |
| 5,233,767 A | 8/1993 | Kramer | |
| 5,244,234 A * | 9/1993 | Oshima et al. | 283/109 |
| 5,274,846 A | 1/1994 | Kolsky | |
| 5,289,830 A | 3/1994 | Levine | |
| 5,322,730 A | 6/1994 | Ou | |
| 5,325,537 A | 7/1994 | Marion | |
| 5,349,893 A | 9/1994 | Dunn | |
| 5,353,455 A | 10/1994 | Loving et al. | |
| 5,360,653 A | 11/1994 | Ackley | |
| 5,364,688 A * | 11/1994 | Mahn, Jr. | 428/187 |
| 5,372,987 A * | 12/1994 | Fisch et al. | 503/227 |
| 5,380,392 A | 1/1995 | Imamura et al. | |
| 5,399,418 A | 3/1995 | Hartmanns et al. | |
| 5,405,665 A | 4/1995 | Skukushima et al. | |
| 5,407,421 A | 4/1995 | Goldsmith | |
| 5,423,087 A | 6/1995 | Krent et al. | |
| 5,452,477 A | 9/1995 | Mann | |
| 5,459,896 A | 10/1995 | Raburn et al. | |
| 5,477,558 A | 12/1995 | Völker et al. | |
| 5,534,208 A | 7/1996 | Barr et al. | |
| 5,534,343 A | 7/1996 | Landi et al. | |
| 5,551,082 A | 9/1996 | Stewart et al. | |
| 5,594,954 A | 1/1997 | Huang | |
| 5,601,895 A | 2/1997 | Cunningham | |
| 5,614,301 A | 3/1997 | Katz | |
| 5,628,063 A | 5/1997 | Reed | |
| 5,660,572 A | 8/1997 | Buck | |
| 5,675,844 A | 10/1997 | Guyton et al. | |
| 5,689,836 A | 11/1997 | Fee et al. | |
| 5,692,935 A | 12/1997 | Smith | |
| 5,697,101 A | 12/1997 | Aldridge | |
| 5,720,714 A | 2/1998 | Penrose | |
| 5,727,252 A | 3/1998 | Oetting et al. | |

(56) References Cited

U.S. PATENT DOCUMENTS

| | | | |
|---|---|---|---|
| 5,738,925 A | 4/1998 | Chaput | |
| 5,780,147 A | 7/1998 | Sugahara et al. | |
| 5,823,981 A | 10/1998 | Grim et al. | |
| 5,915,819 A | 6/1999 | Gooding | |
| 5,920,915 A | 7/1999 | Bainbridge et al. | |
| 5,938,878 A | 8/1999 | Hurley et al. | |
| 5,940,888 A | 8/1999 | Sher | |
| 5,987,643 A | 11/1999 | Beutler | |
| 6,041,447 A | 3/2000 | Endler | |
| 6,053,005 A | 4/2000 | Boitnott | |
| 6,070,267 A | 6/2000 | McKewin | |
| 6,070,273 A | 6/2000 | Sgro | |
| 6,085,353 A | 7/2000 | Van der Sleesen | |
| 6,093,468 A | 7/2000 | Toms et al. | |
| 6,126,699 A * | 10/2000 | McCurley | 8/471 |
| 6,167,790 B1 | 1/2001 | Bambara et al. | |
| 6,219,852 B1 | 4/2001 | Bain et al. | |
| 6,235,661 B1 | 5/2001 | Khanamirian | |
| 6,253,376 B1 | 7/2001 | Ritter | |
| 6,295,654 B1 | 10/2001 | Farrell | |
| 6,301,722 B1 | 10/2001 | Nickerson et al. | |
| 6,317,888 B1 | 11/2001 | McFarlane | |
| 6,374,409 B1 | 4/2002 | Galy | |
| 6,485,448 B2 | 11/2002 | Lamping et al. | |
| 6,584,616 B2 | 7/2003 | Godshaw et al. | |
| 6,654,960 B2 | 12/2003 | Cho | |
| 6,654,962 B2 | 12/2003 | DeMott | |
| 6,702,438 B2 | 3/2004 | Codos et al. | |
| 6,743,325 B1 * | 6/2004 | Taylor | 156/265 |
| 6,820,279 B2 | 11/2004 | Lesosky | |
| 6,841,022 B2 | 1/2005 | Tsukagoshi et al. | |
| 6,851,124 B2 | 2/2005 | Munoz et al. | |
| 6,935,240 B2 | 8/2005 | Gosetti | |
| 6,968,573 B2 | 11/2005 | Silver | |
| 6,969,548 B1 | 11/2005 | Goldfine | |
| 7,007,356 B2 | 3/2006 | Cudney et al. | |
| 7,018,351 B1 | 3/2006 | Iglesias et al. | |
| 7,114,189 B1 | 10/2006 | Kleinert | |
| 7,410,682 B2 * | 8/2008 | Abrams | 428/90 |
| 7,465,485 B2 * | 12/2008 | Abrams | 428/90 |
| RE41,346 E | 5/2010 | Taylor | |
| RE42,689 E | 9/2011 | Taylor | |
| RE43,441 E | 6/2012 | Taylor | |
| 8,231,756 B2 | 7/2012 | Kim | |
| RE43,994 E | 2/2013 | Taylor | |
| 8,425,712 B2 | 4/2013 | Turner | |
| 8,561,214 B2 | 10/2013 | Turner | |
| 2001/0025687 A1* | 10/2001 | Cross | 156/240 |
| 2003/0072889 A1* | 4/2003 | Abrams | 427/458 |
| 2004/0157735 A1* | 8/2004 | Hare | B41M 5/0256 503/201 |
| 2004/0157795 A1* | 8/2004 | Mariotti | C08B 37/0072 514/54 |
| 2005/0158508 A1* | 7/2005 | Abrams | 428/90 |
| 2005/0181183 A1* | 8/2005 | Pacey | 428/195.1 |
| 2006/0199456 A1 | 9/2006 | Taylor | |
| 2007/0000005 A1 | 1/2007 | Wang | |
| 2007/0286982 A1* | 12/2007 | Higgins et al. | 428/95 |
| 2008/0121340 A1* | 5/2008 | Lin | 156/247 |
| 2008/0245469 A1 | 10/2008 | Lin | |
| 2008/0258339 A1* | 10/2008 | Conrad | 264/293 |
| 2008/0264557 A1 | 10/2008 | Kim | |
| 2008/0290556 A1 | 11/2008 | Kim | |
| 2009/0008142 A1* | 1/2009 | Shimizu et al. | 174/261 |
| 2009/0070911 A1 | 3/2009 | Chang | |
| 2009/0155536 A1 | 6/2009 | Chang | |
| 2009/0233511 A1 | 9/2009 | Turner | |
| 2009/0321002 A1 | 12/2009 | Spengler | |
| 2010/0129573 A1 | 5/2010 | Kim | |
| 2010/0192280 A1 | 8/2010 | McClard et al. | |
| 2010/0193117 A1 | 8/2010 | Kim | |
| 2010/0205716 A1 | 8/2010 | Kim | |
| 2010/0205722 A1 | 8/2010 | Kim | |
| 2010/0206472 A1 | 8/2010 | Kim | |
| 2011/0061154 A1 | 3/2011 | Turner et al. | |
| 2012/0015156 A1* | 1/2012 | Abrams | 428/195.1 |

FOREIGN PATENT DOCUMENTS

| | | |
|---|---|---|
| CA | 2162723 | 11/1994 |
| CA | 2289622 | 11/1998 |
| CH | 638665 | 10/1983 |
| CN | 2225163 | 4/1996 |
| CN | 2305870 | 2/1999 |
| DE | 3119489 | 12/1982 |
| DE | 3530397 | 3/1987 |
| DE | 9102039 | 2/1991 |
| DE | 4336468 | 4/1995 |
| EP | 0083454 | 10/1988 |
| EP | 0552304 | 7/1993 |
| EP | 0595887 | 12/1998 |
| EP | 1175840 | 1/2002 |
| FR | 2740303 | 4/1997 |
| FR | 2903579 | 1/2008 |
| GB | 832101 | 4/1960 |
| GB | 1274569 | 5/1972 |
| GB | 2120167 | 11/1983 |
| GB | 2177892 | 2/1987 |
| GB | 2233877 | 1/1991 |
| GB | 2477510 | 8/2011 |
| JP | 1316235 | 12/1989 |
| JP | 10337797 | 12/1989 |
| JP | 2508289 | 6/1994 |
| JP | 10053905 | 2/1998 |
| JP | 2000136414 | 5/2000 |
| WO | WO9723142 | 7/1997 |
| WO | WO9733493 | 9/1997 |
| WO | WO9736740 | 10/1997 |
| WO | WO9934972 | 7/1999 |
| WO | WO9935926 | 7/1999 |
| WO | WO0015085 | 3/2000 |
| WO | WO0050336 | 8/2000 |
| WO | WO0103530 | 1/2001 |
| WO | WO0115892 | 3/2001 |
| WO | WO0216124 | 2/2002 |
| WO | WO02081202 | 10/2002 |
| WO | WO2006036072 | 4/2006 |
| WO | WO2006088734 | 8/2006 |
| WO | WO2008044015 | 4/2008 |
| WO | WO2010104868 | 9/2010 |

OTHER PUBLICATIONS

International Search Report and Written Opinion of the International Searching Authority in PCT application No. PCT/US2011/058813, mailed on Mar. 21, 2012.
International Preliminary Report on Patentability for PCT Application No. PCT/US2011/058813, mailed on Jun. 13, 2013.
Andrew Alderson, "A Triumph of Lateral Thought", in Chemistry & Industry, May 17, 1999; pp. 384-391.
Burke, "A Stretch of the Imagination", New Scientist Magazine, vol. 154 issue 2085, Jul. 6, 1997 at p. 36 (available from research.dh.umu.se/dynamic/artiklar/shape/stretch.html, last accessed Nov. 11, 2013).
Joseph Hamill & Carolyn K. Bensel, "Biomechanical Analysis of Military Boots: Phase III", in United States Army Technical Report NATICK/TR-96.013; dated Mar. 11, 1996; 42 pages.
Joseph F. Annis & Paul Webb, "Development of a Space Activity Suit", in NASA Contractor Report NASA CR-1892; dated Nov. 1971; 139 pages.

* cited by examiner

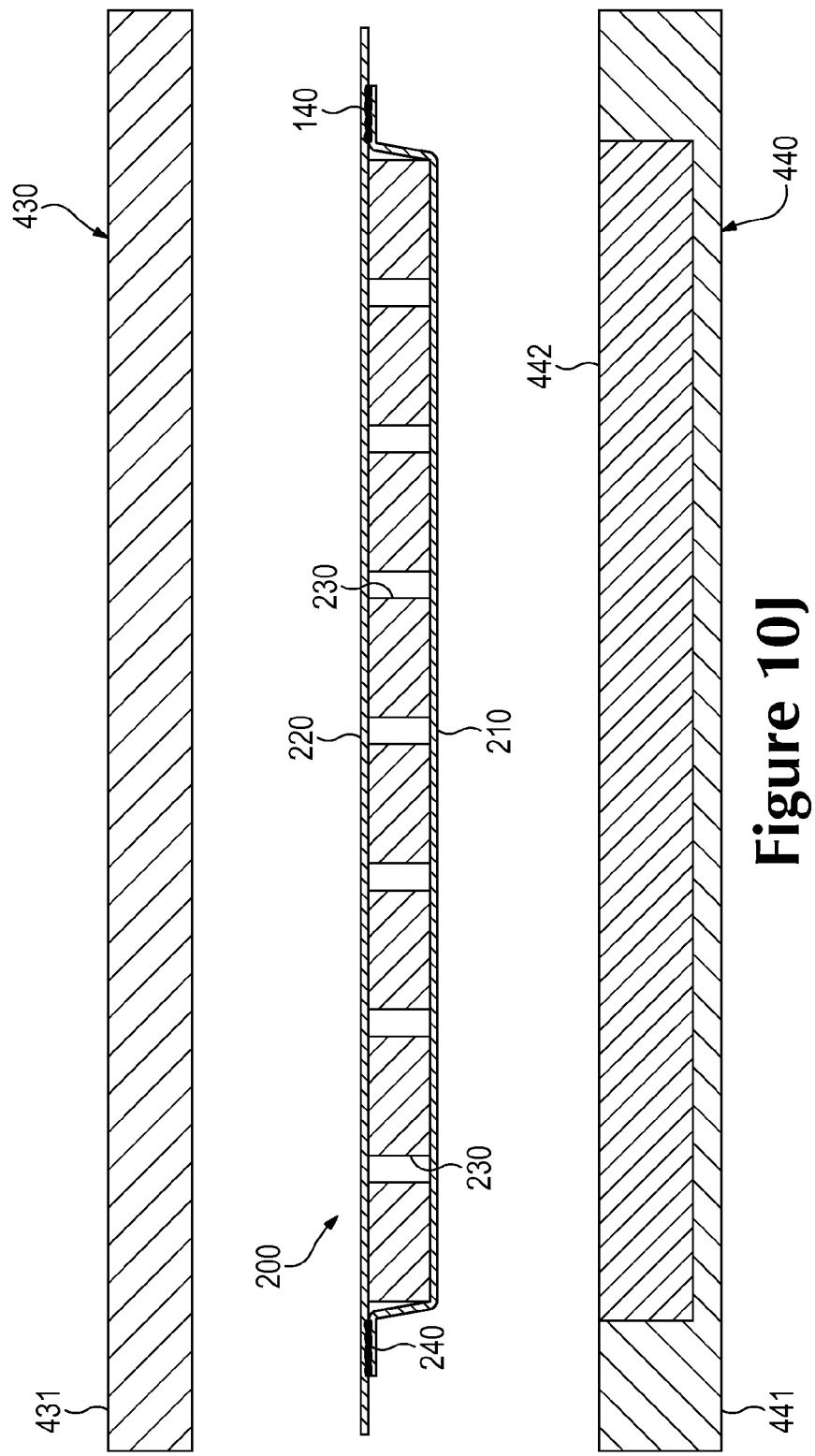

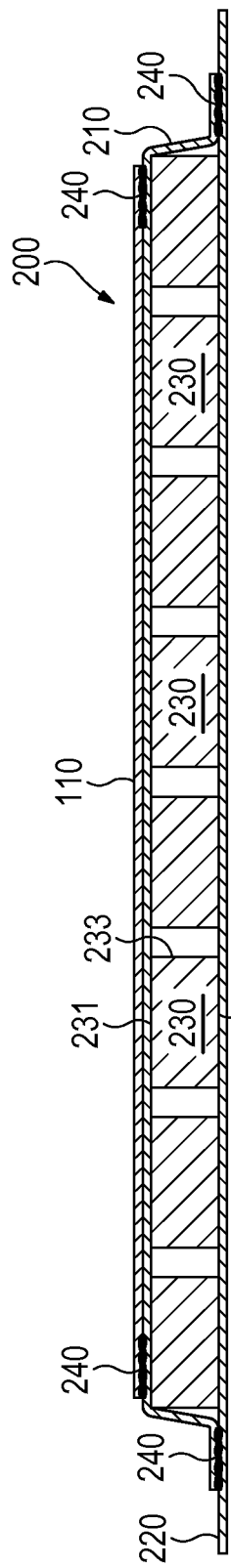
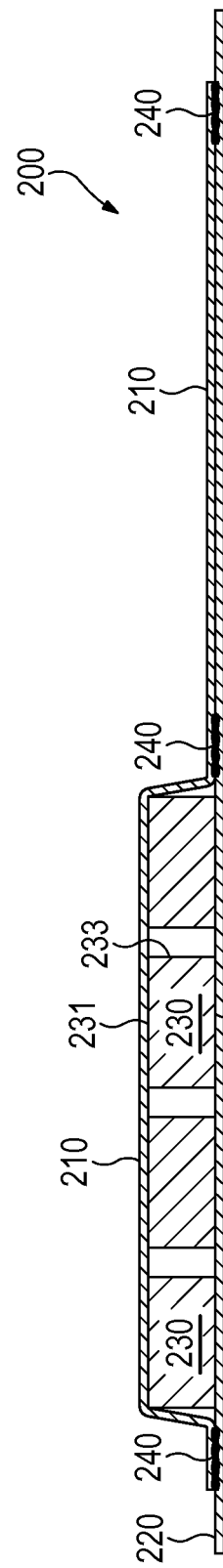

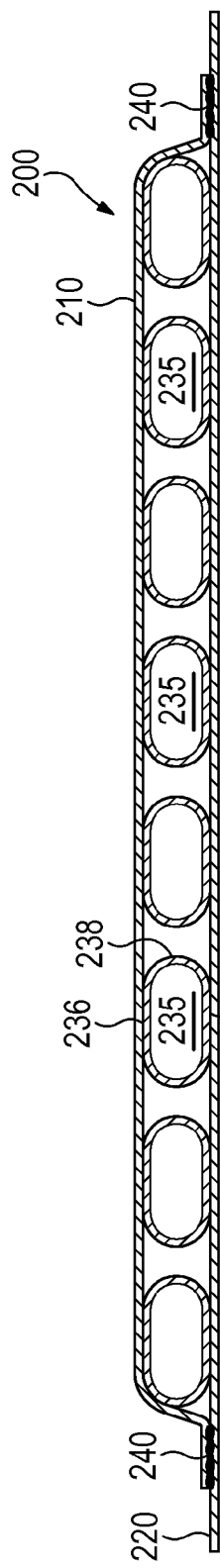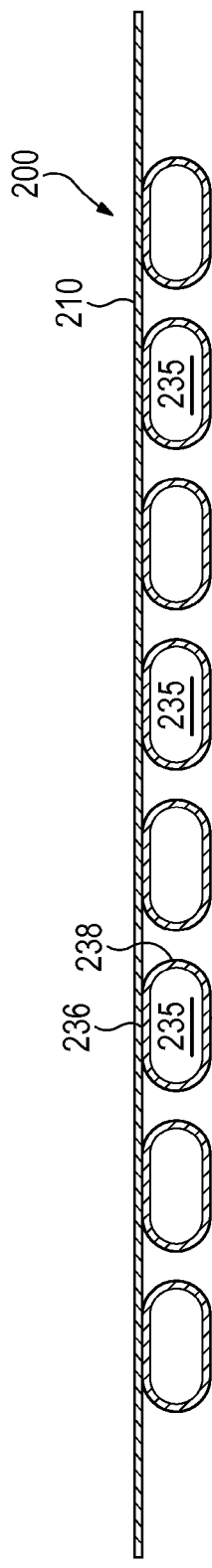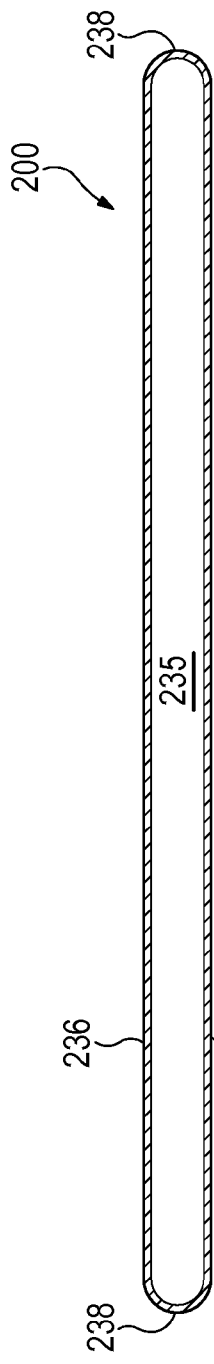

METHOD OF MANUFACTURING DYE-SUBLIMATION PRINTED ELEMENTS

BACKGROUND

Textile materials that provide shelter or serve as barriers between environments are commonly incorporated into a variety of products. Textile materials may serve as wrappings or covers. Textile materials may also serve as screens separating one area from another, as when employed in tents or windbreaks. Textile materials may additionally serve ornamental or informative purposes, as when employed in labels, banners, or flags. For example, apparel based upon or otherwise incorporating textile materials may cover the body of a wearer, protecting it from environmental factors such as temperature and precipitation. Apparel may also serve to protect a wearer from wind. In addition, apparel may serve to identify a wearer. Such apparel may be formed for a variety of uses. For example, apparel may be formed for use in athletic training and athletic competition in a variety of different sports, such as baseball, basketball, American football, soccer, hockey, cricket, tennis, golf, track and field events, running, swimming, bicycling, skiing, snowboarding, surfing, windsurfing, and many others. Additionally, printed elements may be incorporated into other products, such as sports balls and other equipment used in athletics.

Materials or elements that impart padding, cushioning, or otherwise attenuate impact forces are also commonly incorporated into a variety of products. Athletic apparel, for example, often incorporates cushioning elements that protect the wearer from contact with other athletes, equipment, or the ground. More specifically, pads used in American football and hockey incorporate cushioning elements that provide impact protection to various parts of a wearer. Helmets used in American football, hockey, bicycling, skiing, snowboarding, and skateboarding incorporate cushioning elements that provide head protection during falls or crashes. Similarly, gloves used in soccer (e.g., by goalies) and hockey incorporate cushioning elements that provide protection to the hands of a wearer.

Indicia such as numbers, letters, words, symbols, marks, graphics, pictures, and illustrations may be imparted to surfaces of a variety of products. Indicia may serve to communicate information, to facilitate identification, or to provide decorative ornamentation, for example. Indicia may be imparted to a surface through any of a variety of techniques, including printing techniques. In some printing processes, which may be referred to as dye-sublimation printing, dyes used in the printing process may begin in a solid state, then sublimate from the solid state to a gas state upon application of heat. Subsequently, the dyes in the gas state, in the course of cooling back to the solid state, may adhere to a surface, may be absorbed by a material of the surface, or may be otherwise transferred to the surface.

Some printed elements to which indicia have been transferred may be textile elements, which may be incorporated into articles of apparel. Other printed elements may be cushioning elements, which may also be incorporated into articles of apparel. Accordingly, apparel (such as athletic apparel) may incorporate printed textile elements, printed cushioning elements, or both. In addition to apparel, printed textile elements and printed cushioning elements may also be incorporated into various other articles or as part of various other articles. For example, wrappings, covers, screens, labels, tents, banners, and flags may all incorporate printed textile elements. In addition, mats (e.g., for yoga or camping), chair cushions, and backpacks may all incorporate printed cushioning elements.

SUMMARY

Various methods of manufacturing printed elements incorporating indicia, which may themselves be incorporated into articles of apparel and other products, are disclosed below. In one step of an exemplary method of manufacturing a printed element, indicia is printed by dye-sublimation on a first material. In another step, a dye retention layer is positioned adjacent to the first material and the indicia. In another step, a second material layer is positioned adjacent to the first material. In another step, the first material, the second material, and the dye retention layer are compressed and heated to secure the first material to the second material.

In one step of an exemplary method of manufacturing a cushioning component, indicia is printed by dye-sublimation at a first temperature on a textile material. In another step, a non-absorbent material is positioned adjacent to the textile material and the indicia. In another step, the cushioning component is formed by (a) pressing the non-absorbent material against the textile material and (b) pressing the textile material against a polymer foam material at a second temperature, the first temperature being greater than the second temperature.

In one step of an exemplary method of manufacturing an article of apparel, an order including data representing indicia is received. In another step, the indicia is printed by dye-sublimation on a surface of a first textile structure according to the data representing the indicia. In another step, a plurality of polymer foam elements is located between the first textile structure and a second textile structure. In another step, a non-absorbent material is positioned adjacent to the first textile structure and the indicia. In another step, the first textile structure, the second textile structure, the polymer foam elements, and the non-absorbent material are compressed and heated to secure the first textile structure to at least one of the second textile structure and the polymer foam elements. In another step, the non-absorbent material is removed. In another step, the first textile structure, the second textile structure, and the polymer foam elements are incorporated into the article of apparel.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 10A-10J are schematic cross-sectional views of the second manufacturing process, as respectively defined by section lines 10A-10J in FIGS. 9A-9J.

FIGS. 12A-12K are cross-sectional views corresponding with FIG. 5A and depicting further configurations of the cushioning element.

DETAILED DESCRIPTION

Figure 1:
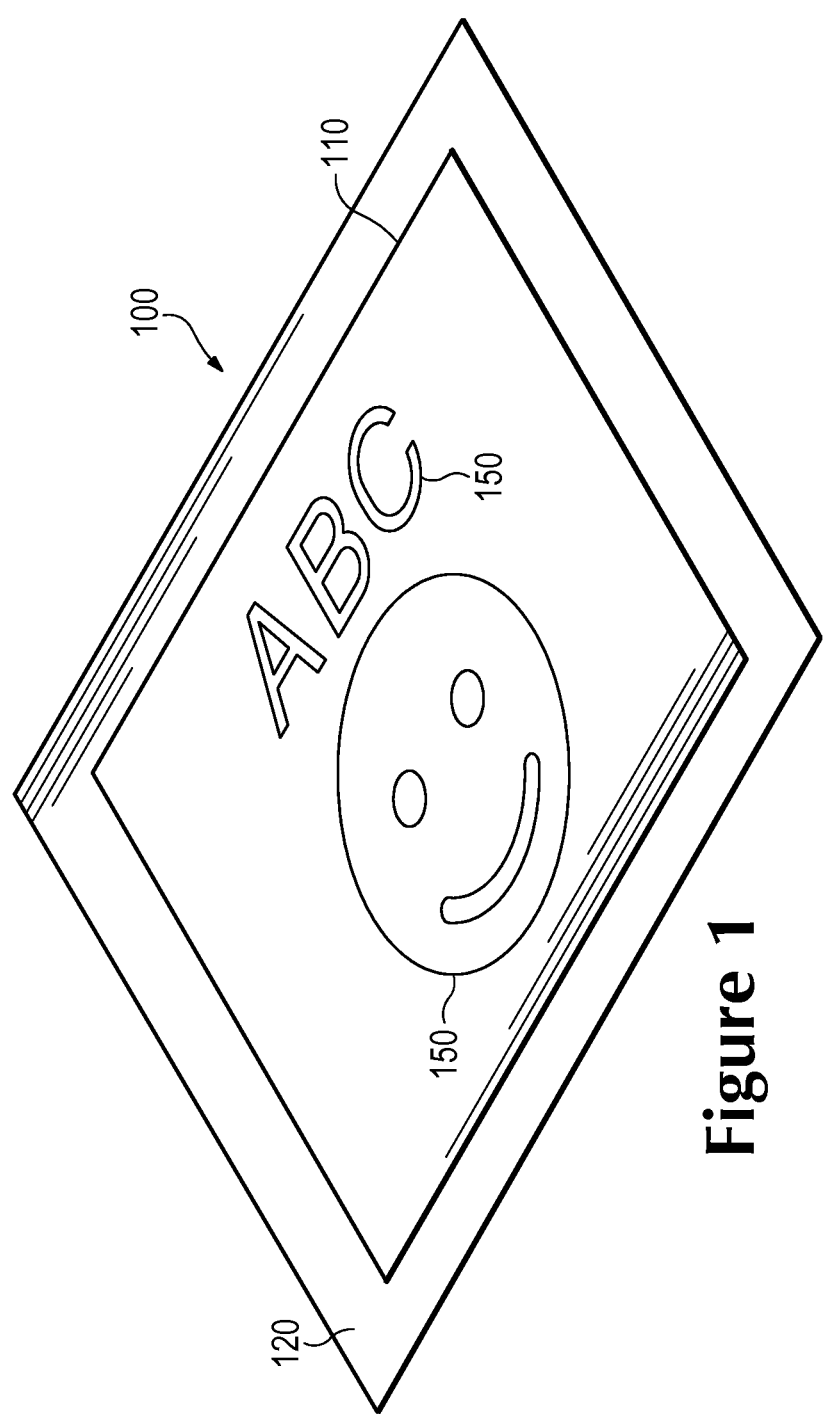
FIG. 1 is a perspective view of a printed element.

A computer or software file may include custom indicia data, which may be a digital or binary representation of one or more numbers, letters, words, symbols, marks, graphics, pictures, illustrations, or other indicia. That is, a computer or software file may include data representing custom-ordered indicia. A customer may be willing to purchase one or more products onto which custom-ordered indicia has been imparted. In turn, according to a variety of manufacturing processes, upon receiving an order from a customer including indicia data, dye-sublimation printing may be employed to impart the custom-ordered indicia onto a variety of printed elements, such as textile elements and cushioning elements. When used to impart indicia to various printed elements, dye-sublimation printing may impart indicia of a comparatively higher quality than other processes that may be used to impart indicia to printed elements, such as other printing processes.

In some manufacturing processes, steps subsequent to dye-sublimation printing may subject or expose a printed element, or one or more printed surfaces of the printed element, to relatively high temperatures. For example, a dye-sublimation printing step may be performed at a temperature of approximately 425° F. (i.e., approximately 218° C.). Subsequent to the dye-sublimation printing step, a printed element may undergo a step in which some portion of the printed element is heat-bonded, or thermalbonded, to another element. Such a thermalbonding step may subject or expose a printed element, or one or more printed surfaces of the printed element, to a temperature of approximately 325° F. (i.e., approximately 163° C.). In other manufacturing processes, higher or lower temperatures may be utilized for both printing and bonding. In some such processes, the temperature at which the dye-sublimation printing step is performed may be lower than the temperature at which the subsequent bonding step is performed.

In manufacturing processes that incorporate both a dye-sublimation printing step and one or more subsequent high-temperature steps (e.g., bonding), dye retention layers may be used in the subsequent high-temperature steps. Dye retention layers may be sheets of material incorporating one or more layers of dye-resistant material. That is, dyes used in dye-sublimation printing processes may not adhere to a surface of a dye retention layer, or may not be absorbed by a material of a surface of the dye retention layer, or may not be otherwise transferred to a surface of the dye retention layer. When incorporated into high-temperature steps subsequent to dye-sublimation printing steps, dye retention layers may advantageously improve the final quality of indicia imparted onto surfaces of various printed elements.

The following discussion and accompanying Figures disclose various printed elements, such as textile elements and cushioning elements. Additionally, the following discussion and accompanying Figures disclose various processes associated with manufacturing the printed elements. The printed elements may be incorporated into a variety of products, including articles of apparel (e.g., shorts, pants, shirts, wraps, gloves, helmets, and footwear), sports balls and athletic equipment, mats, seat cushions, and backpacks, for example. The printed elements may also be incorporated into a variety of other consumer or industrial products.

Printed Element Configuration

Figure 2:
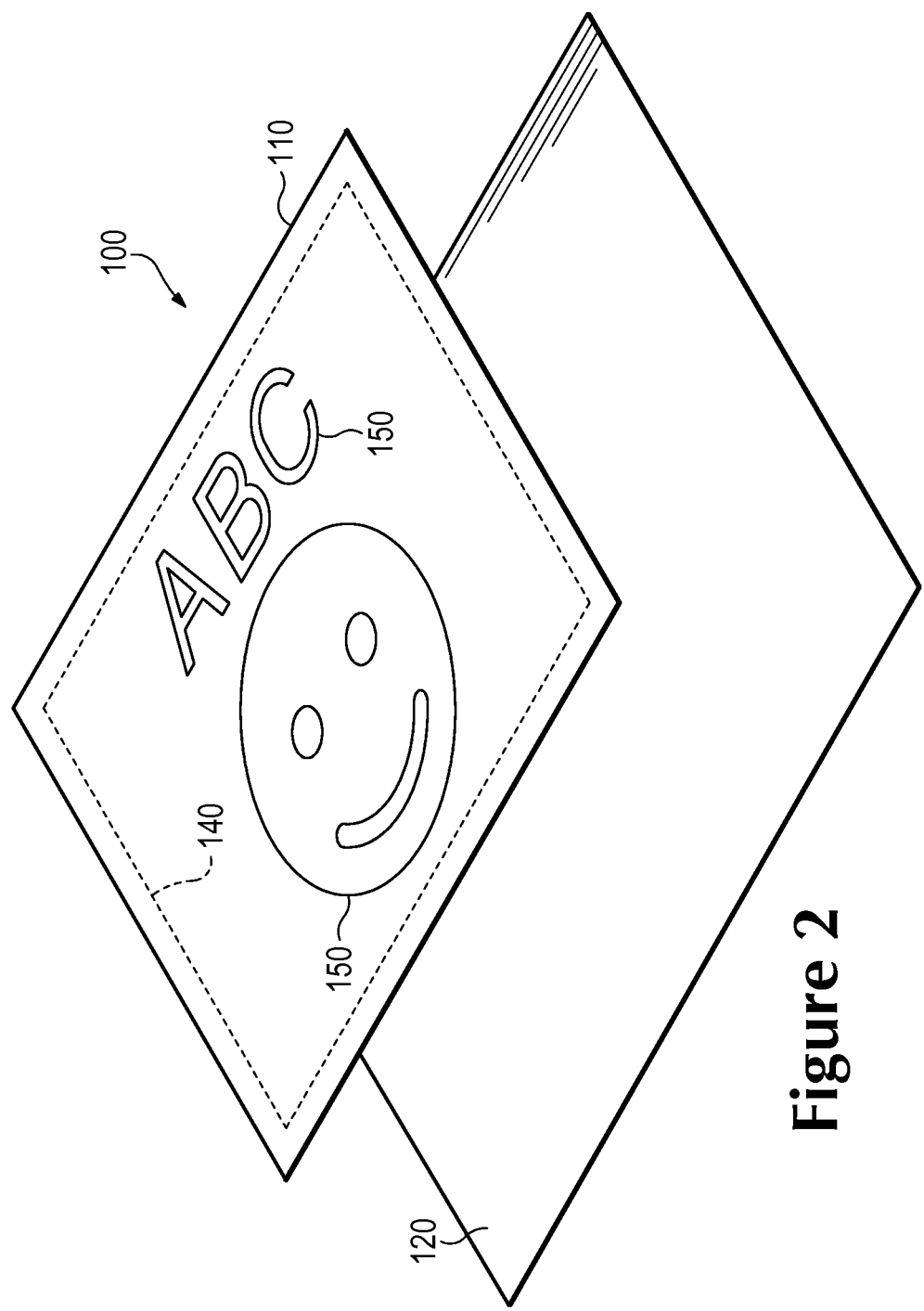
FIG. 2 is an exploded perspective view of the printed element.
Figure 3:
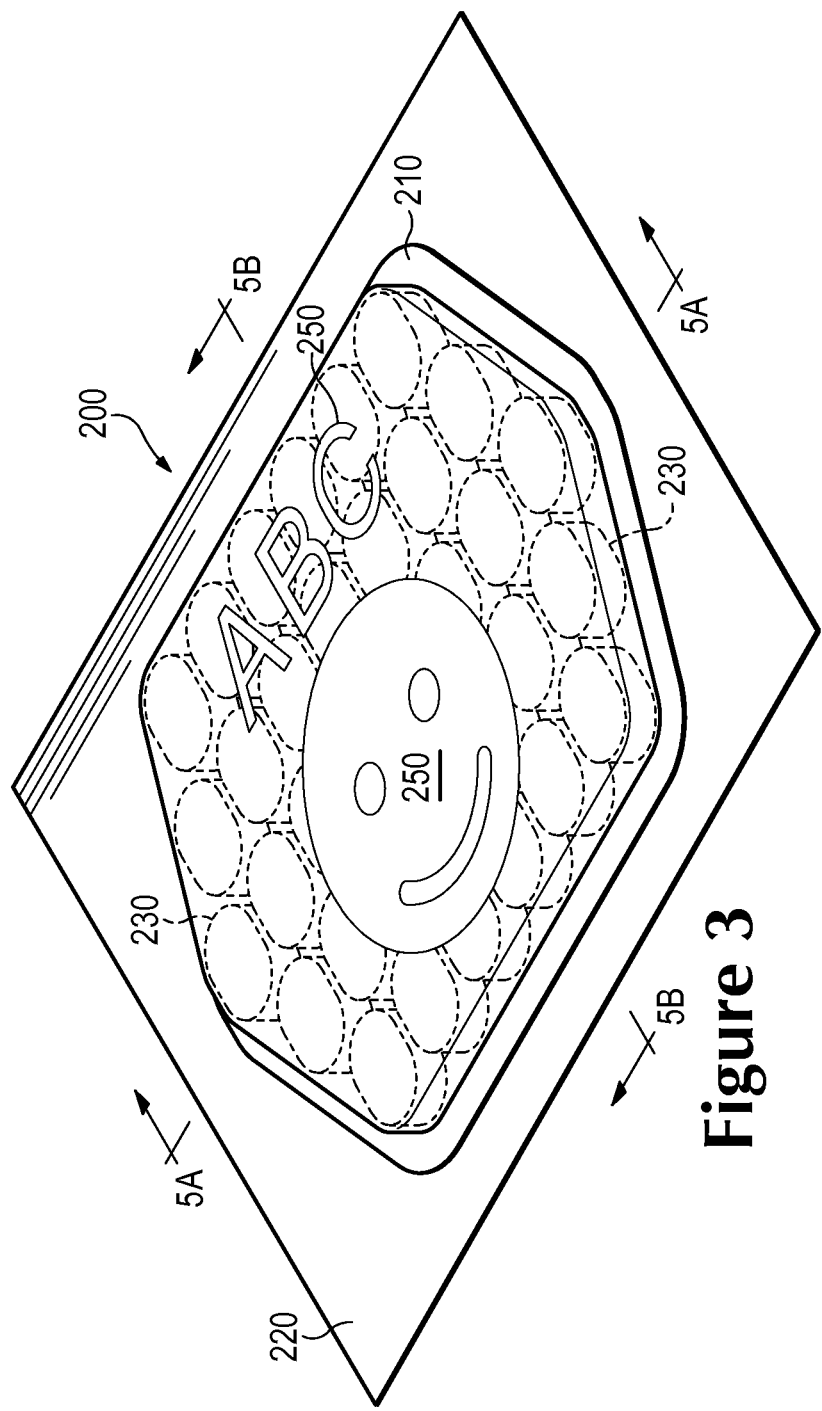
FIG. 3 is a perspective view of a cushioning element.
Figure 4:
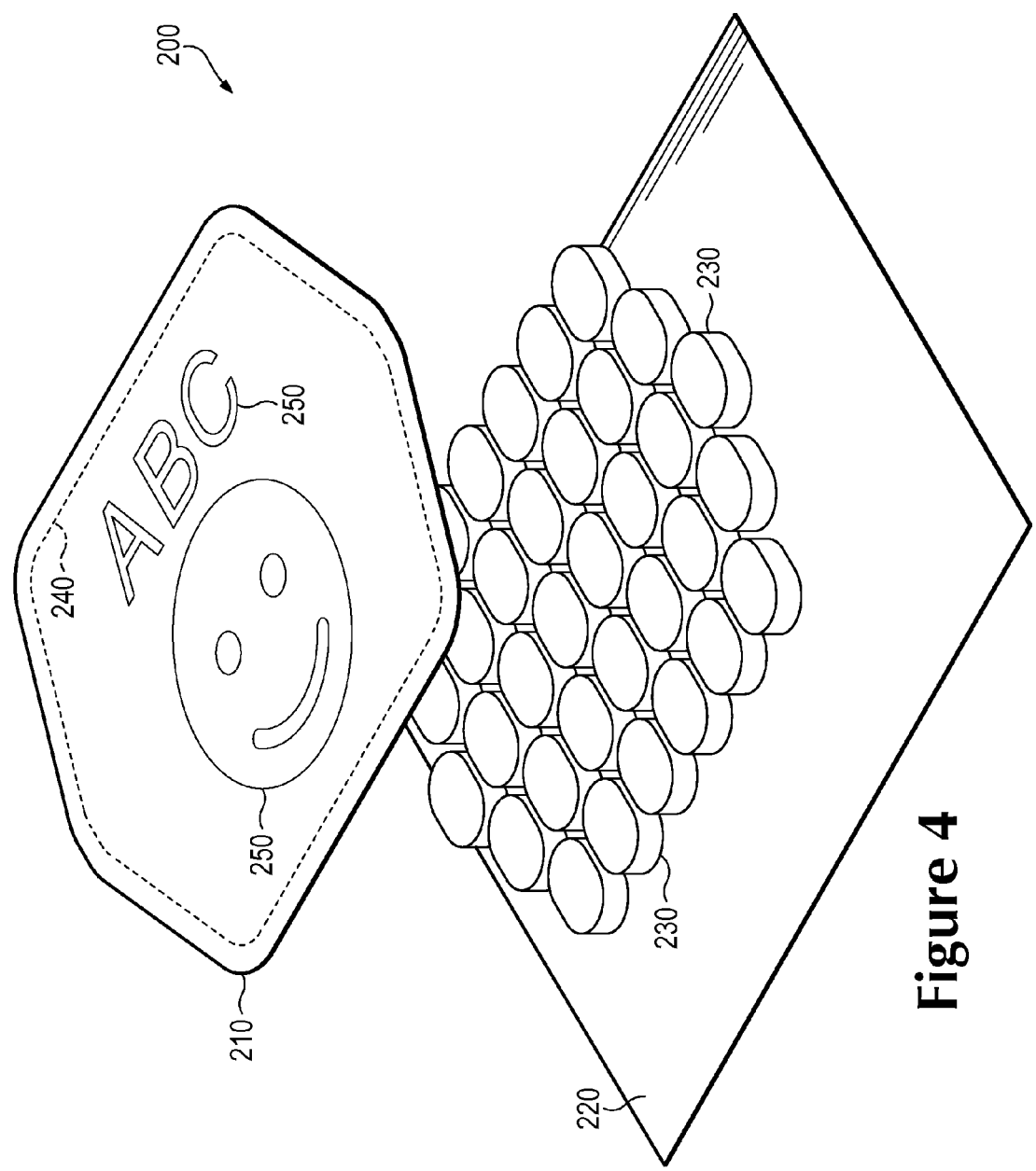
FIG. 4 is an exploded perspective view of the cushioning element.
Figure 5A:
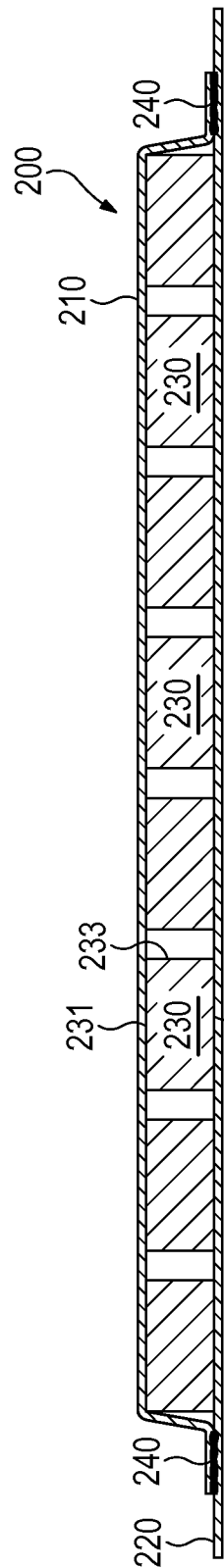
FIGS. 5A-5B are cross-sectional views of the cushioning element, as defined by section lines 5A and 5B in FIG. 3.
Figure 5B:
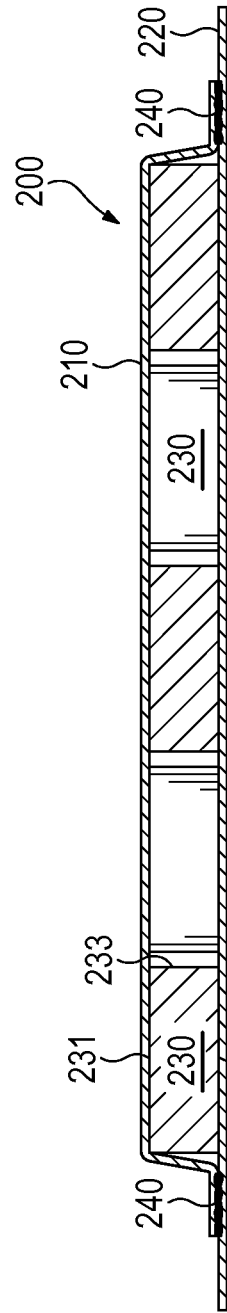

An example configuration for printed element 100 is depicted in FIGS. 1-2 as a textile element including a first material layer 110, a second material layer 120, a bonding element 140, and indicia 150. First material layer 110 and second material layer 120 cooperatively form printed element 100. Bonding element 140 is located between material layers 110 and 120 to join material layers 110 and 120 together. A surface of first material layer 110 includes indicia 150, thereby incorporating indicia 150 into printed element 100.

A variety of materials may be utilized for first material layer 110 and second material layer 120, including various textiles, polymer sheets, leather, or synthetic leather, for example. Combinations of these materials (e.g., a polymer sheet bonded to a textile) may also be utilized for material layers 110 and 120. Although material layers 110 and 120 may be formed from the same material, each of material layers 110 and 120 may also be formed from different materials. With regard to textiles, material layers 110 and 120 may be formed from knitted, woven, non-woven, spacer, or mesh textile components that include rayon, nylon, polyester, polyacrylic, elastane, cotton, wool, or silk, for example. Moreover, the textiles may be non-stretch, may exhibit one-directional stretch, or may exhibit multi-directional stretch. Accordingly, a variety of materials are suitable for first material layer 110 and second material layer 120.

Bonding element 140 joins material layers 110 and 120. Referring to FIG. 2, for example, bonding element 140 is located at an edge of first material layer 110 and extends entirely around first material layer 110. Although bonding element 140 is located at a perimeter of first material layer 110, bonding element 140 is absent from a central area of first material layer 110. In effect, therefore, bonding element 140 is absent from a portion of first material layer 110. In other configurations, however, bonding element 140 may be located in the central area of first material layer 110, or may correspond in location to any part or parts of first material layer 110, including substantially all of first material layer 110.

A variety of materials may be utilized for bonding element 140, including thermoplastic polymer materials (e.g., polyurethane), various adhesives, or heat-activated adhesives, for example. When formed from a thermoplastic polymer material, for example, the application of heat and pressure may be utilized to bond material layers 110 and 120 to each other with bonding element 140. A thermoplastic polymer material melts when heated and returns to a solid state when cooled sufficiently. Based upon this property of thermoplastic polymer materials, heat-bonding or thermal-bonding processes may be utilized to form a thermalbond that joins material layer 110 and 120.

As utilized herein, the term "thermalbonding" or variants thereof is defined as a securing technique between two elements that involves a softening or melting of a thermoplastic polymer material within at least one of the elements such that the materials of the elements are secured to each other when cooled. Similarly, the term "thermalbond" or variants thereof is defined as the bond, link, or structure that joins two elements through a process that involves a softening or melting of a thermoplastic polymer material within at least one of the elements such that the materials of the elements are secured to each other when cooled.

With regard to bonding element 140, thermalbonding may involve, for example, the melting or softening of thermoplastic materials within bonding element 140 to join material layers 110 and 120 together. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, or in addition to thermalbonding, an adhesive, a thermally-activated adhesive, or other securing structure may be utilized to join material layers 110 and 120.

First material layer 110 also includes indicia 150, which faces outward and is visible from an exterior of printed element 100. Indicia 150 may be one or more numbers, letters, words, symbols, marks, graphics, pictures, or illustrations, or any combination thereof. For example, indicia 150 may communicate information, facilitate identification, or provide decorative ornamentation.

Cushioning Element Configuration

An example configuration for a cushioning element 200 is depicted in FIGS. 3-5B as including a first material layer 210, a second material layer 220, a plurality of pad components 230, a bonding element 240, and indicia 250. First material layer 210 and second material layer 220 cooperatively form an outer surface or covering for cushioning element 200. That is, first material layer 210 and second material layer 220 cooperatively form a pocket or void in which pad components 230 are located. Whereas second material layer 220 is depicted as having a generally planar configuration, first material layer 210 extends over pad components 230 and also along sides of pad components 230. Bonding element 240 is located between material layers 210 and 220 to join material layers 210 and 220 together. A surface of first material layer 210 includes indicia 250, thereby incorporating indicia 250 into printed element 200.

A variety of materials may be utilized for first material layer 210 and second material layer 220, including various textiles, polymer sheets, leather, or synthetic leather, for example. Combinations of these materials (e.g., a polymer sheet bonded to a textile) may also be utilized for material layers 210 and 220. Although material layers 210 and 220 may be formed from the same material, each of material layers 210 and 220 may also be formed from different materials. With regard to textiles, material layers 210 and 220 may be formed from knitted, woven, non-woven, spacer, or mesh textile components that include rayon, nylon, polyester, polyacrylic, elastane, cotton, wool, or silk, for example. Moreover, the textiles may be non-stretch, may exhibit one-directional stretch, or may exhibit multi-directional stretch. Accordingly, a variety of materials are suitable for first material layer 210 and second material layer 220.

Pad components 230 are located between and secured to each of material layers 210 and 220. Each of pad components 230 has a first surface 231 secured to first material layer 210, an opposite second surface 232 secured to second material layer 220, and a side surface 233 that extends between surfaces 231 and 232. Although the shapes of pad components 230 may vary significantly, each of surfaces 231 and 232 are depicted as having an elliptical or generally elongate shape with rounded end areas, and side surface 233 extends in a generally straight fashion between surfaces 231 and 232. Pad components 230 are also depicted as being spaced evenly from each other and arranged in rows, particularly offset rows, but may be spaced or located in a variety of arrangements. An advantage of arranging pad components 230 in offset rows is that the area between pad components 230 is effectively minimized, while retaining a regular spacing between adjacent pad components 230.

A variety of materials may be utilized for pad components 230, including various polymer foam materials that return to an original shape after being compressed. Examples of suitable polymer foam materials for pad components 230 include polyurethane, ethylvinylacetate, polyester, polypropylene, and polyethylene foams. Moreover, both thermoplastic and thermoset polymer foam materials may be utilized. In some configurations of cushioning element 200, pad components 230 may be formed from a polymer foam material with a varying density, or solid polymer or rubber materials may be utilized. Fluid-filled chambers may also be utilized as pad components 230. Also, different pad components 230 may be formed from different materials, or may be formed from similar materials with different densities. As discussed in greater detail below, the polymer foam materials forming pad components 230 attenuate impact forces to provide cushioning or protection. By selecting thicknesses, materials, and densities for each of the various pad components 230, the degree of impact force attenuation may be varied throughout cushioning element 200 to impart a desired degree of cushioning or protection.

The compressible polymer foam materials forming pad components 230 attenuate impact forces that compress or otherwise contact cushioning element 200. When incorporated into an article of apparel, for example, the polymer foam materials of pad components 230 may compress to protect a wearer from contact with other athletes, equipment, or the ground. Accordingly, cushioning element 200 may be utilized to provide cushioning or protection to areas of individual 10 or other wearers that are covered by cushioning element 200.

Bonding element 240 joins material layers 210 and 220 around a perimeter of pad components 230. Referring to FIG. 7, for example, bonding element 240 is located at an edge of first material layer 210 and extends entirely around first material layer 210. Although bonding element 240 is located at a perimeter of first material layer 210, bonding element 240 is absent from a central area of first material layer 210. That is, bonding element 240 has an aperture that exposes the central area of first material layer 210. In effect, therefore, bonding element 240 is absent from the portion of first material layer 210 that joins with pad components 230. In other configurations, however, bonding element 240 may be located in the central area of first material layer 210 and may be utilized to join pad components 230 to first material layer 210.

A variety of materials may be utilized for bonding element 240, including thermoplastic polymer materials (e.g., polyurethane), various adhesives, or heat-activated adhesives, for example. When formed from a thermoplastic polymer material, for example, the application of heat and pressure may be utilized to bond material layers 210 and 220 to each other with bonding element 240. A thermoplastic polymer material melts when heated and returns to a solid state when cooled sufficiently. Based upon this property of thermoplastic polymer materials, heat-bonding or thermalbonding processes may be utilized to form a thermalbond that joins material layer 210 and 220.

With regard to bonding element 240, thermalbonding may involve, for example, the melting or softening of thermoplastic materials within bonding element 240 to join material layers 210 and 220 together. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, or in addition to thermalbonding, an adhesive, a thermally-activated adhesive, or other securing structure may be utilized to join material layers 210 and 220.

First material layer 210 also includes indicia 250. Indicia 250 may be one or more numbers, letters, words, symbols, marks, graphics, pictures, or illustrations, or any combination thereof. For example, indicia 250 may communicate information, facilitate identification, or provide decorative ornamentation.

First Manufacturing Process

Figure 6:
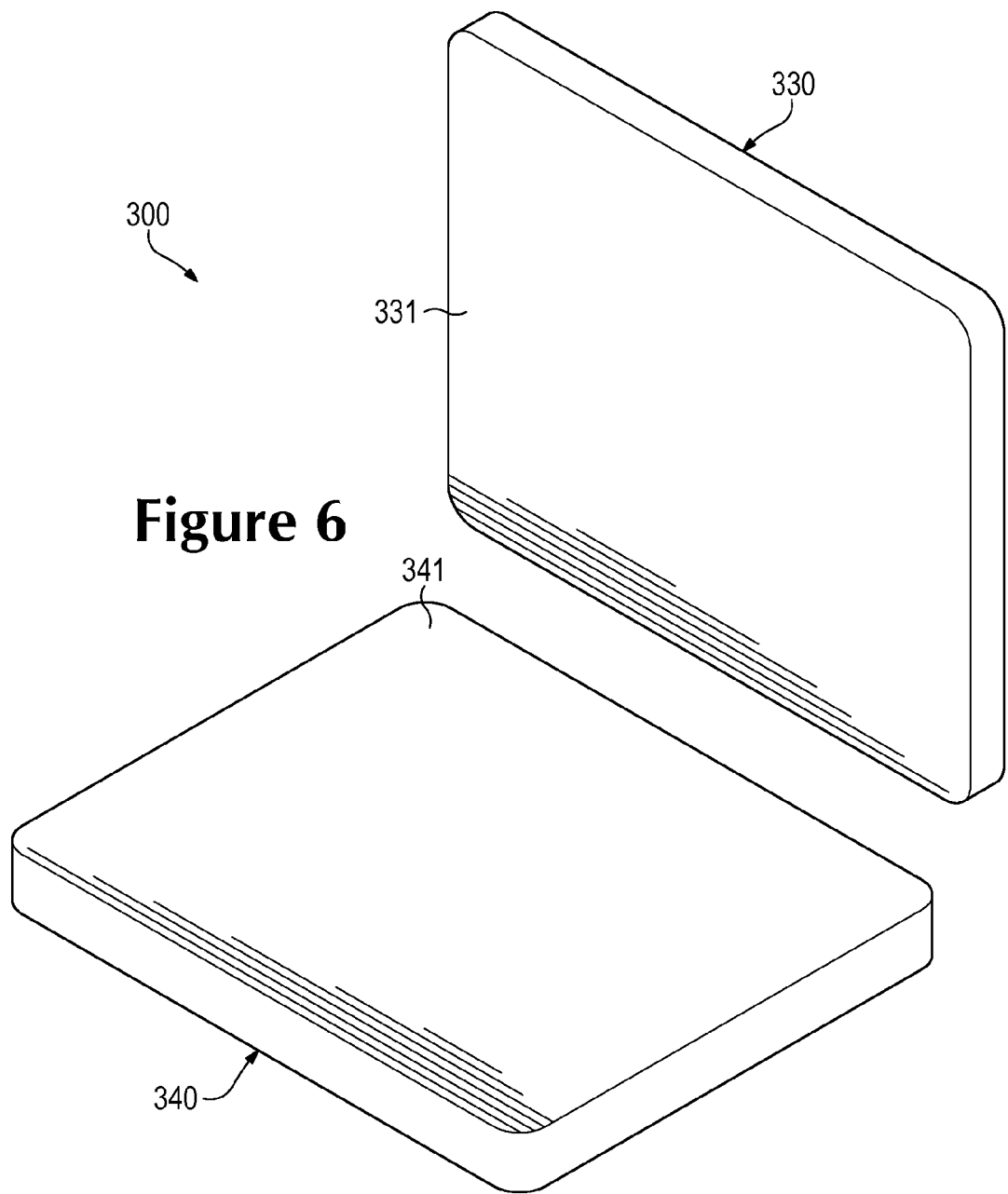
FIG. 6 is a perspective view of portions of a manufacturing apparatus utilized in a first manufacturing process.

A variety of techniques may be utilized to manufacture printed element 100. With reference to FIG. 6, a manufacturing apparatus 300 is disclosed as including a heating plate 330 and a press plate 340. The configurations depicted in FIG. 6 and discussed below for manufacturing apparatus 300 are intended to provide an example of a manufacturing apparatus that may be utilized in the manufacture of printed element 100. A variety of other manufacturing apparatuses that operate in a similar manner may also be utilized.

Heating plate 330 includes a base 331 that may also be formed from a durable and rigid material, such as steel or aluminum, and incorporates heating elements. More particularly, electric coils may extend through base 331 to heat base 331 to temperatures that bond material layers 110 and 120 to each other with bonding element 140. As an alternative, base 331 may incorporate fluid channels through which a heated fluid passes, radiant heaters, radio frequency emitters, or other devices may be utilized. In some configurations of heating plate 330, a surface of base 331 that contacts portions of printed element 100 during the manufacturing process may incorporate a rubber or silicone material.

Press plate 340 includes a base 341. As with base 331, base 341 may be formed from a durable and rigid material, such as steel or aluminum.

Figure 7A:
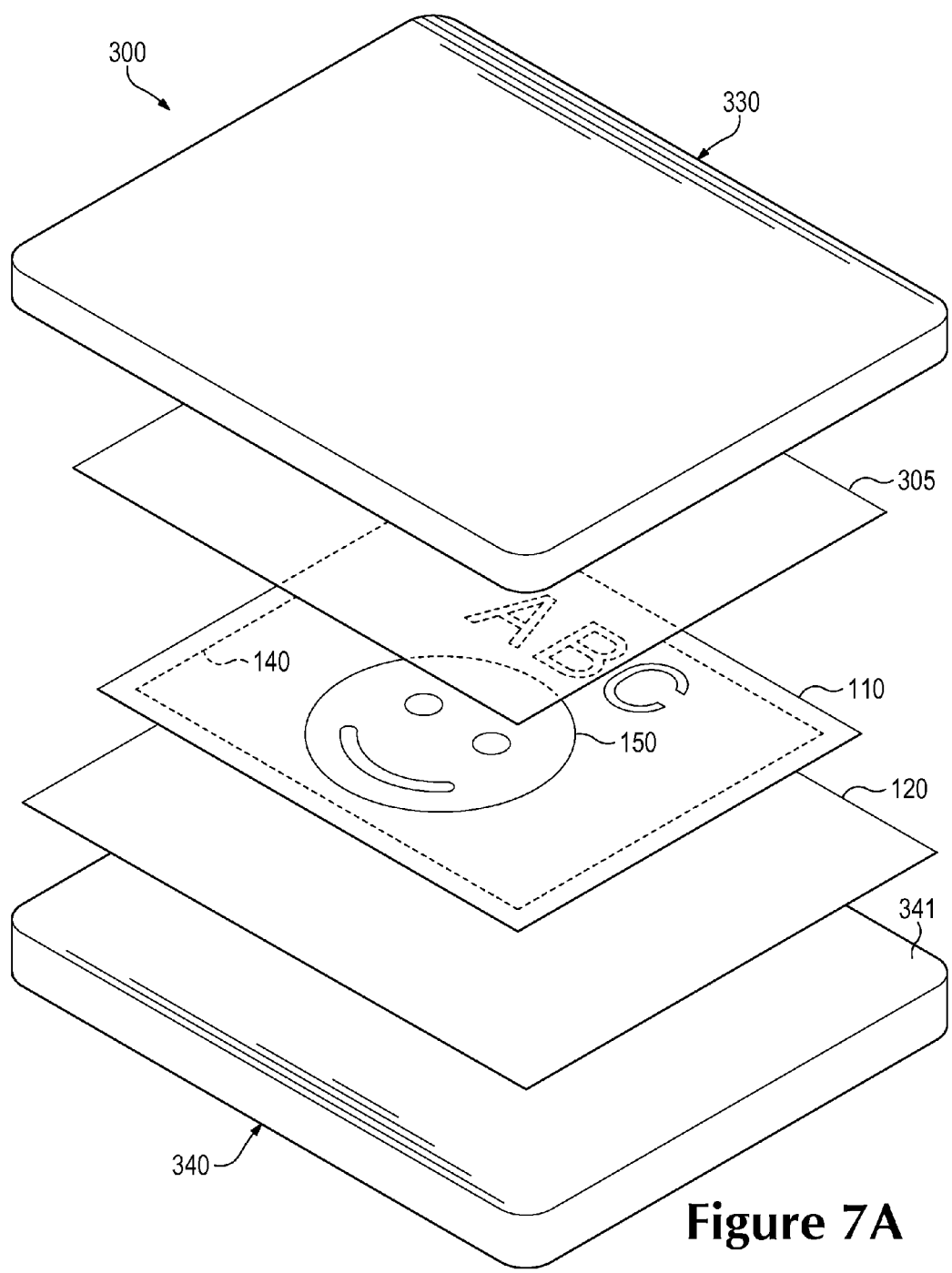
FIGS. 7A-7C are schematic perspective views of the first manufacturing process.
Figure 7B:
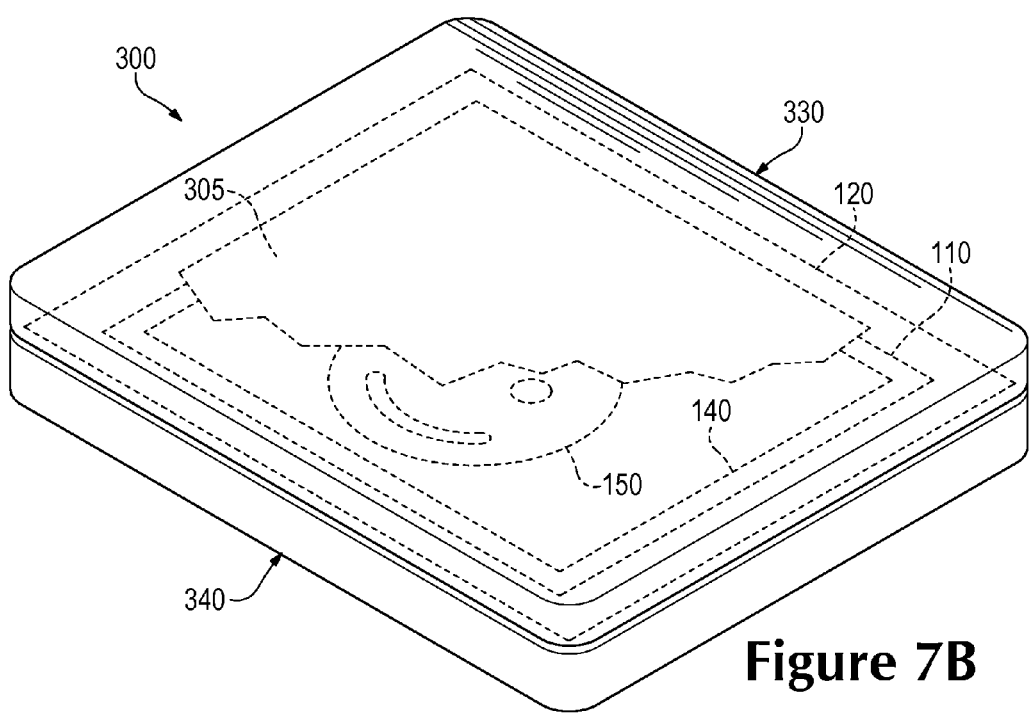
Figure 7C:
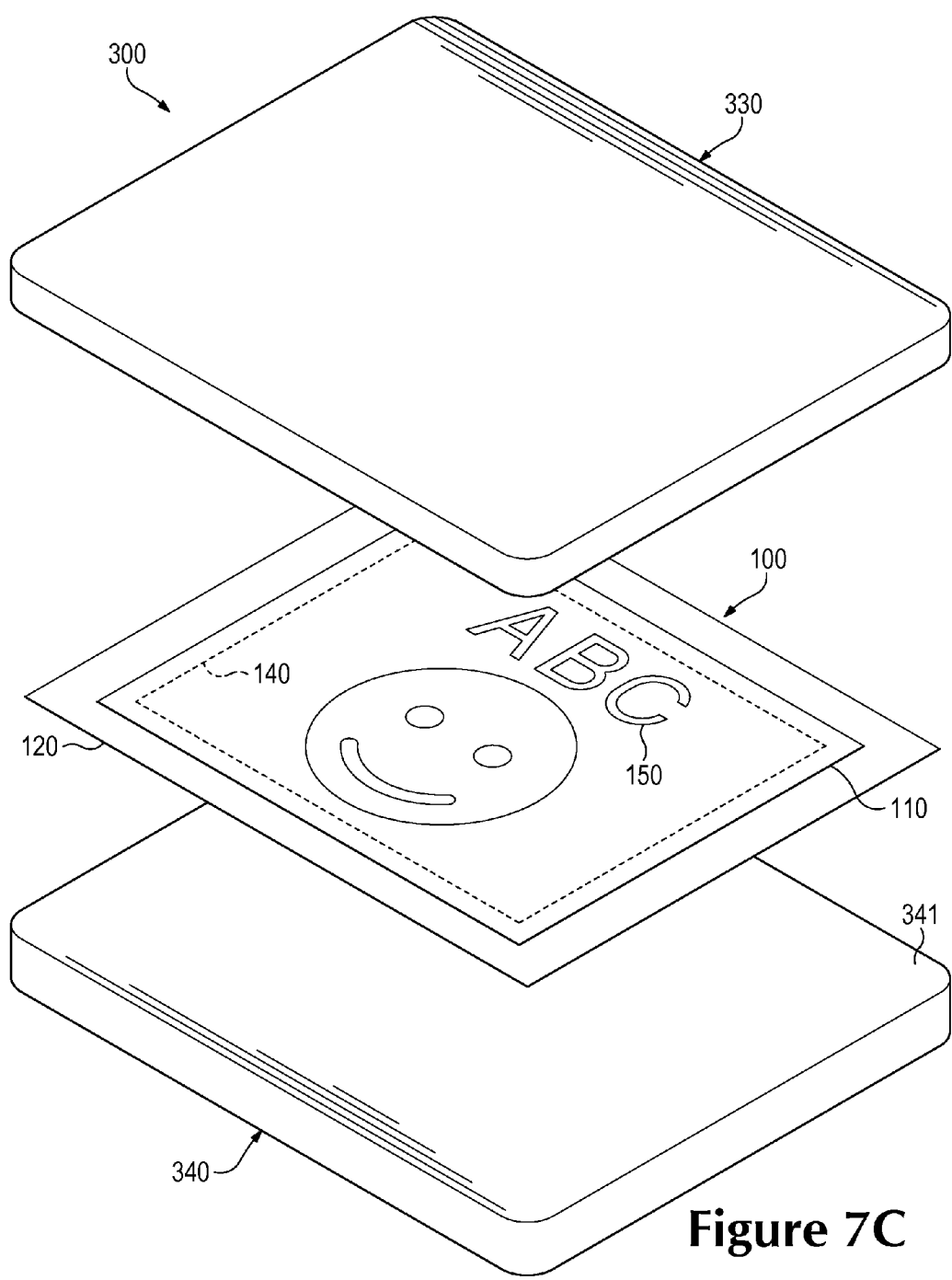

With reference to FIGS. 7A-7C, an example of a suitable manufacturing process utilizing manufacturing apparatus 300 is disclosed. Initially, press plate 340 is positioned adjacent to second material layer 120, as depicted in FIG. 7A. Second material layer 120 is positioned adjacent to first material layer 110. First material layer 110 includes bonding element 140 and indicia 150. Accordingly, second material layer 120 is located between press plate 340 and first material layer 110. Additionally, a dye retention layer 305 is positioned adjacent to first material layer 110, and heating plate 330 is positioned adjacent to dye retention layer 305. More particularly, dye retention layer 305 is positioned adjacent to a surface of first material layer 110 that includes indicia 150 or upon which indicia 150 is printed. Accordingly, first material layer 110 is located between second material layer 120 and dye retention layer 305, and dye retention layer 305 is located between first material layer 110 and heating plate 330.

Dye retention layer 305 may be a sheet of material incorporating one or more layers of dye-resistant material. For example, dye retention layer 305 may be a wax paper or a release paper. Alternatively, dye retention layer 305 may be a sheet of material having one or more plasticized surfaces. As a further alternative, dye retention layer 305 may be a polymer sheet. Dye retention layer 305 may be any sheet having a surface to which dyes used in dye-sublimation printing processes do not adhere or adhere minimally, or any sheet having a surface that does not absorb dyes used in dye-sublimation printing processes, or any sheet having a surface to which dyes used in dye-sublimation printing processes otherwise do not transfer.

Following positioning of the various elements of printed element 100, press plate 340 and heating plate 330 close upon and compress first material layer 110, bonding element 140, second material layer 120, and dye retention layer 305, as depicted in FIG. 7B. As discussed above, base 331 of heating plate 330 incorporates heating elements. As such, the temperature of base 331 may be elevated to a point where bonding (e.g., thermalbonding) occurs between first material layer 110, bonding element 140, and second material layer 120. Dye retention layer 305 may inhibit the movement of dye away from first material 110 during the thermalbonding step. For example, dye retention layer 305 may inhibit the transfer of re-sublimated dye away from first material 110.

When compressed between heating plate 330 and press plate 340, energy from heating plate 330 may be utilized to bond first material layer 110, bonding element 140, and second material layer 120 to each other. As discussed above, a thermoplastic polymer material melts when heated and returns to a solid state when cooled sufficiently. Based upon this property of thermoplastic polymer materials, thermalbonding processes may be utilized to form a thermalbond that joins first material layer 110, bonding element 140, and second material layer 120. In this context, thermalbonding may involve, for example, (a) the melting or softening of thermoplastic materials within any of first material layer 110, bonding element 140, and second material layer 120 that joins the elements together, (b) the melting or softening of a thermoplastic material within bonding element 140 such that the thermoplastic polymer material extends into or infiltrates the structure of a textile utilized for first material layer 110 or second material layer 120, or (c) the melting or softening of a thermoplastic material within one of first material layer 110 or second material layer 120 such that the thermoplastic polymer material extends into or infiltrates the structure of the other material layer.

Thermalbonding may occur when only one element includes a thermoplastic polymer material or when both elements include thermoplastic polymer materials. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, an adhesive, a thermally-activated adhesive, or other securing structure may be utilized to join first material layer 110 and second material layer 120.

Once compression and bonding are complete, heating plate 330 and press plate 320 separate to (a) expose printed element 100 in which first material layer 110 and second material layer 120 are bonded together and (b) remove dye retention layer 305, as depicted in FIG. 7C. At this stage of the manufacturing process, the manufacture of printed element 100 is effectively complete.

The printing of indicia 150 utilizing a dye-sublimation process may, for example, occur at a temperature of 425° F. (i.e., approximately 218° C.). The bonding of first material layer 110 to second material layer 120 with bonding element 140 may occur at a lower temperature, such as 325° F. (i.e., approximately 163° C.). Although the bonding temperature is less than the dye-sublimation temperature, a portion of the dye forming indicia 150 may sublimate when exposed to the bonding temperature. The presence of dye retention layer 305, however, ensures that a large percentage of the sublimated dye remains within indicia 150, instead of escaping from printed element 100. That is, dye retention layer 305 ensures that the dye forming indicia 150 remains does not escape or otherwise leave printed element 100 during the bonding of first material layer 110 to second material layer 120 with bonding element 140.

The above discussion of FIGS. 7A-7C provides an example of a suitable manufacturing process for printed element 100. In general, an advantage of the manufacturing process is that various constituent elements of printed element 100 may be joined through thermalbonding while accommodating a previous dye-sublimation printing step. In particular, by inhibiting the movement of dye away from first material 110 in the thermalbonding step, the use of dye retention layer 305 may advantageously improve the final quality of indicia 150, such as custom-ordered indicia, that may already have been transferred to the surface of first material layer 110.

A variety of other manufacturing processes or variations of the manufacturing process discussed above may also be utilized. In some alternate configurations, optional stitching, adhesive, or thermalbonding steps may be utilized to supplement the joining of material layers 110 and 120 of printed element 100. For example, a sewing or stitching machine may be utilized to further secure material layers 110 and 120 to each other around the periphery of printed element 100. Additionally, a sewing or stitching machine may be utilized to incorporate printed element 100 into an article of apparel or another article.

Second Manufacturing Process

Figure 8:
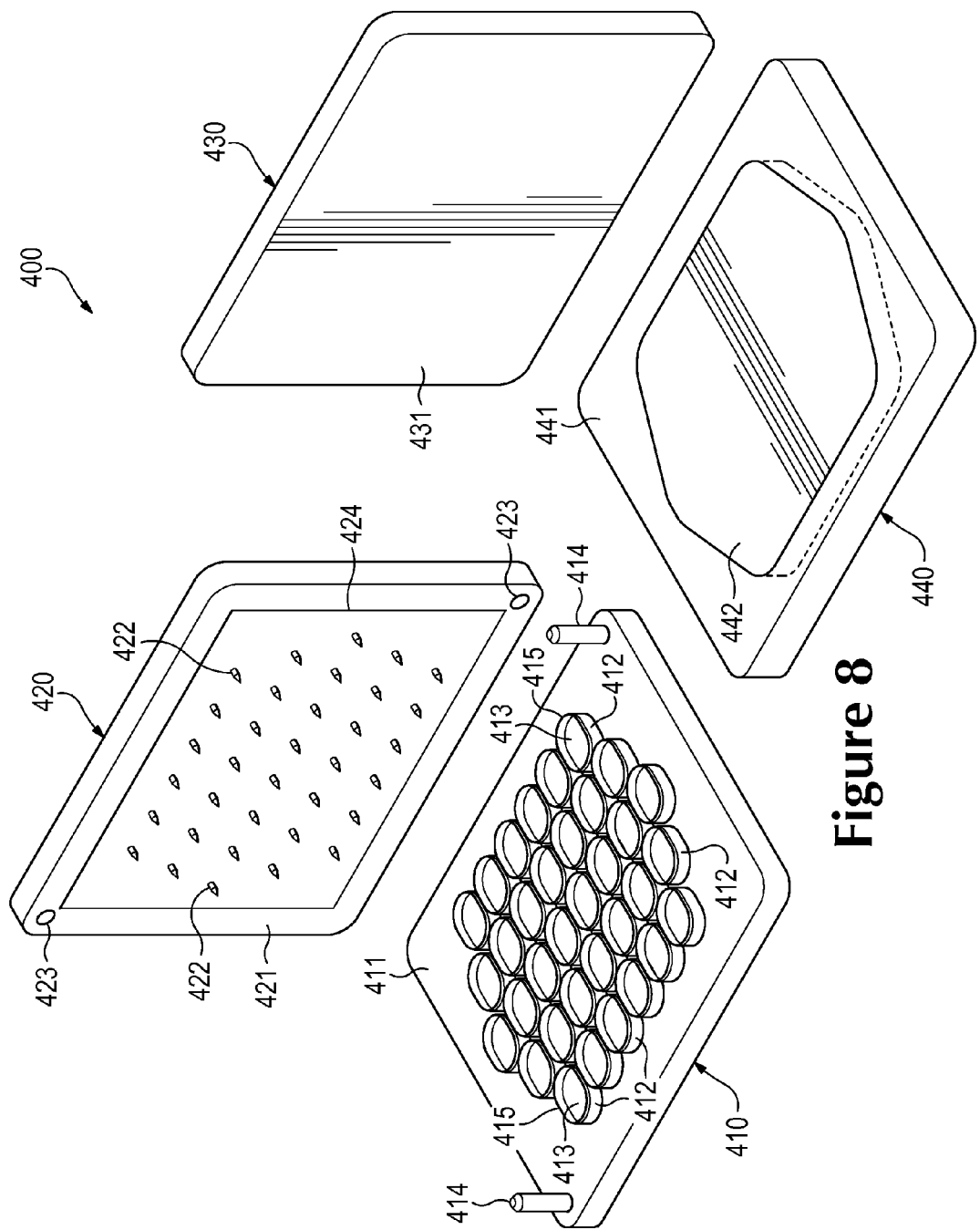
FIG. 8 is a perspective view of portions of a manufacturing apparatus utilized in a second manufacturing process.

A variety of techniques may be utilized to manufacture cushioning element 200. With reference to FIG. 8, a manufacturing apparatus 400 is disclosed as including a die 410, an extractor 420, a heating plate 430, and a press plate 440. The configurations depicted in FIG. 8 and discussed below for manufacturing apparatus 400 are intended to provide an example of a manufacturing apparatus that may be utilized in the manufacture of cushioning element 200. A variety of other manufacturing apparatuses that operate in a similar manner may also be utilized.

Die 410 includes a base 411, a plurality of die elements 412, a plurality of ejection members 413, and a pair of registration pegs 414. Base 411 is formed from a durable and rigid material, such as steel or aluminum, to provide a foundation for die 410. Die elements 412 extend outward (e.g., upward) from base 411 and exhibit a general shape of pad components 230. More particularly, an interior area of each die element 412 has the general shape of an individual pad component 230. As discussed in greater detail below, edges 415 (e.g., upper edges) of die elements 412 are utilized to cut through a material that forms pad components 230, thereby shaping and forming each of pad components 230. Edges 415 may generally have a sharpened configuration that assists with cutting through the material that forms pad components 230. Ejection members 413 are located within the interior areas of each die element 412 and are spaced (e.g., spaced downward) from edges 415. As an example, ejection members 413 may be formed from a polymer foam material with lesser compressibility than a polymer foam material forming pad components 230. Additionally, registration pegs 414 extend outward (e.g., upward) from base 411.

In addition to having the general shape of pad components 230, die elements 412 are arranged or otherwise located relative to each other in the same manner as pad components 230. As noted above, pad components 230 are depicted as being spaced evenly from each other and arranged in offset rows. Similarly, die elements 412 are spaced evenly from each other and arranged in offset rows. That is, die elements 412 are arranged in a configuration that corresponds with the positions of pad components 230 in cushioning element 200. If, however, a different arrangement is desired for pad components 230, then die elements 412 may be moved or otherwise repositioned to correspond with the different arrangement.

Extractor 420 includes a base 421, a plurality of extractor elements 422, a pair of registration apertures 423, and an extractor sheet 424. Base 421 is formed from a durable and rigid material, such as steel or aluminum, to provide a foundation for extractor 420. Extractor elements 422 have the configurations of pins that extend outward (e.g., downward) from base 421 and have sharpened or pointed end areas. As discussed in greater detail below, extractor elements 422 assist with retaining the positions of pad components 230 upon removal from die 410. As an alternative to pins, extractor elements 422 (a) may have the configurations of needles, nails, spikes, or prongs or (b) may be a vacuum system that retains the positions of pad components 230 upon removal from die 410, for example. Accordingly, extractor elements 422 may be any device or system that may be used to secure pad components 230 to extractor 420 and assist with retaining the positions of pad components 230 upon removal from die 410. Additionally, registration apertures 423 form holes in base 421 that are positioned to correspond with and receive registration pegs 414.

The positions of extractor elements 422 correspond with the locations of die elements 412. Moreover, extractor elements 422 are arranged or otherwise located relative to each other in the same manner as die elements 412, and die elements 412 are arranged or otherwise located relative to each other in the same manner as pad components 230. That is, extractor elements 422 are arranged in a configuration that corresponds with the positions of pad components 230 in cushioning element 200. If, however, a different arrangement is desired for pad components 230, then extractor elements 422 and die elements 412 may be moved or otherwise repositioned to correspond with the different arrangement.

Extractor sheet 424 lays adjacent to base 421 and includes a plurality of apertures that receive extractor elements 422. That is, extractor elements 422 extend through the apertures in extractor sheet 424. A variety of materials may be utilized for extractor sheet 424, including various polymer materials and metals.

Heating plate 430 includes a base 431 that may also be formed from a durable and rigid material, such as steel or aluminum, and incorporates heating elements. More particularly, electric coils may extend through base 431 to heat base 431 to temperatures that bond (a) pad components 230 to material layers 210 and 220 and (b) material layers 210 and 220 to each other with bonding element 240. As an alternative, base 431 may incorporate fluid channels through which a heated fluid passes, or radiant heaters, radio frequency emitters, or other devices may be utilized. In some configurations of heating plate 430, a surface of base 431 that contacts portions of cushioning element 200 during the manufacturing process may incorporate a rubber or silicone material.

Press plate 440 includes a base 441 and a compressible material 442. As with bases 411, 421, and 431, base 441 may be formed from a durable and rigid material, such as steel or aluminum. Compressible material 442 is recessed within a surface of base 441 and is formed from a material (e.g., silicone, polymer foam) that compresses or deforms when a force is applied and returns to an original shape when the force is removed. Although a single element of compressible material 442 is depicted, some configurations may incorporate multiple elements of compressible material 442 with different degrees of compressibility, depending upon the configuration of cushioning element 200 that is being manufactured.

Figure 9A:
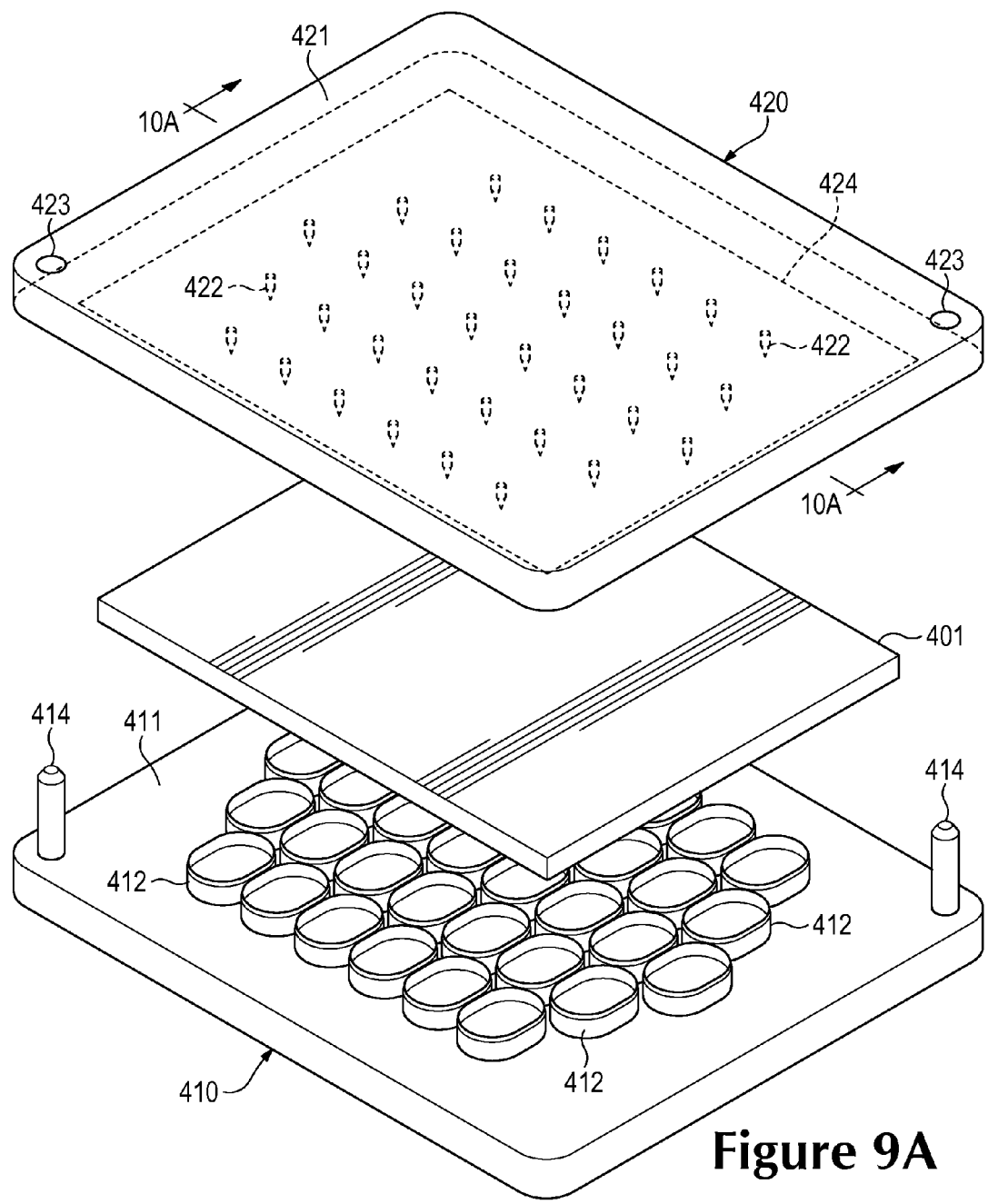
FIGS. 9A-9J are schematic perspective views of the second manufacturing process.
Figure 9B:
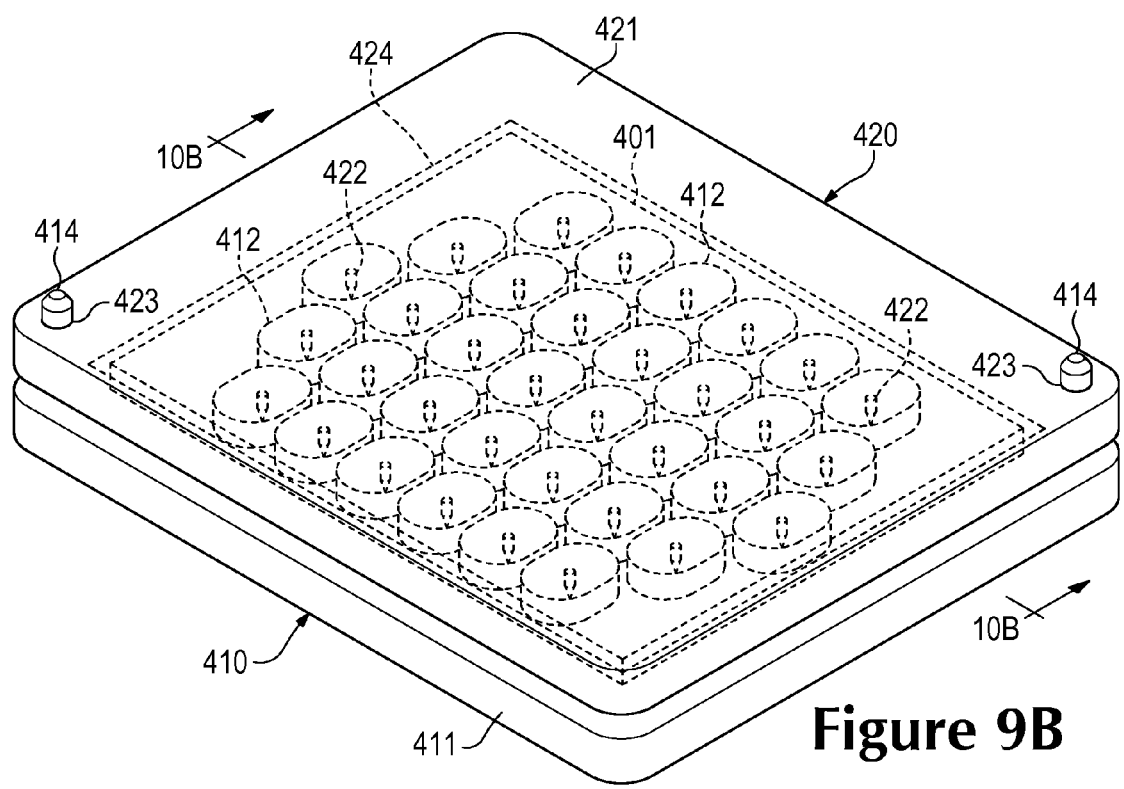
Figure 9C:
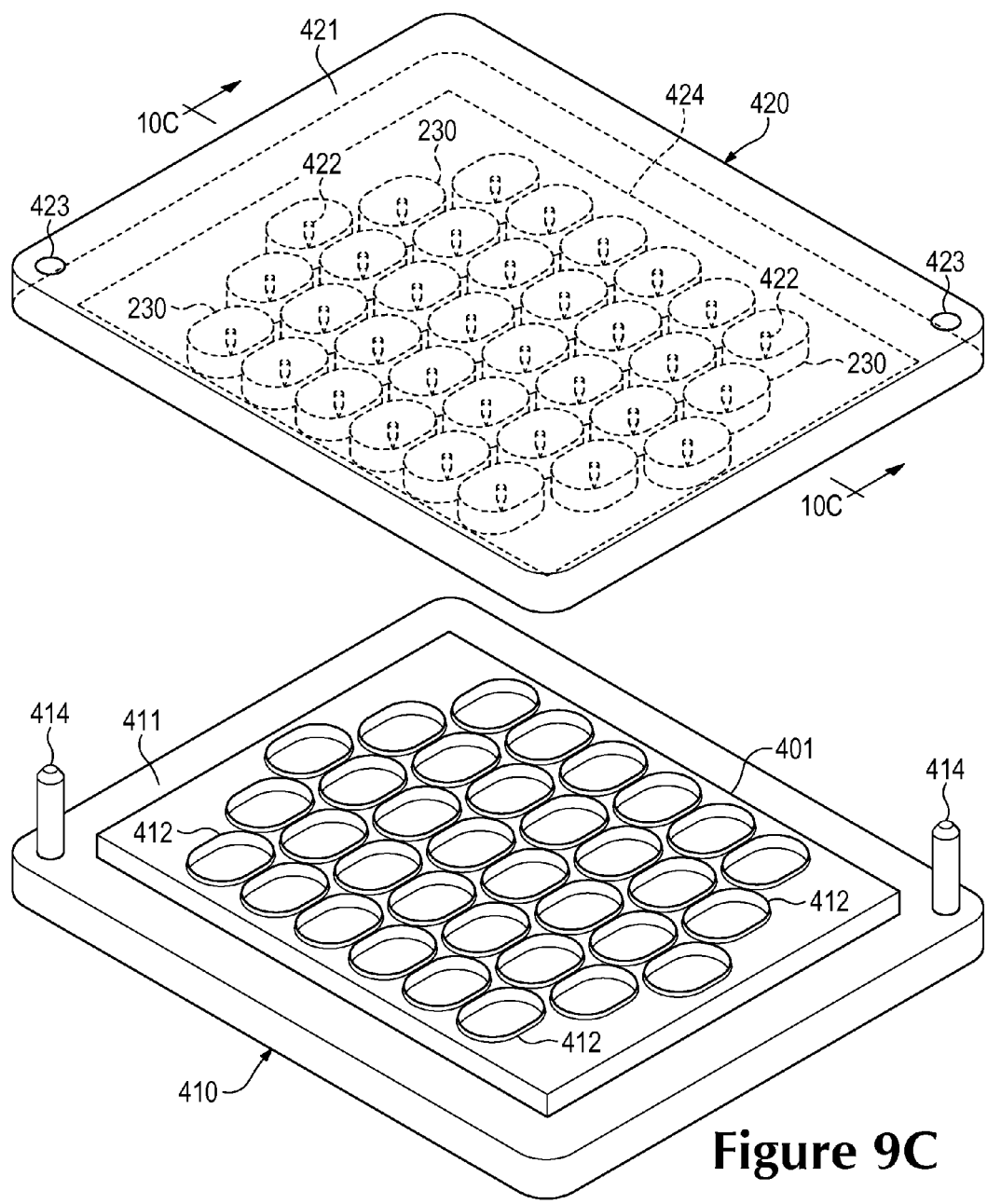

With reference to FIGS. 9A-9J and 10A-10J, an example of a suitable manufacturing process utilizing manufacturing apparatus 400 is disclosed. Initially, die elements 412 are arranged in a configuration that corresponds with the positions of pad components 230 in cushioning element 200, and extractor elements 422 are arranged in a configuration that corresponds with the positions of die elements 412 and pad components 230 in cushioning element 200. A blank 401 is then placed between die 410 and extractor 420, as depicted in FIGS. 9A and 10A. Blank 401, from which pad components 230 are cut, is formed from the same material as pad components 230 and has a thickness of pad components 230. Once blank 401 is positioned, die 410 and extractor 420 close upon, compress, and cut blank 401, as depicted in FIGS. 9B and 10B. More particularly, (a) blank 401 is compressed against die elements 412 such that edges 415 pierce and cut through blank 401 and (b) extractor elements 422 pierce and enter blank 401. Note that extractor elements 422 are positioned to correspond with each of die elements 412 and enter the interior area of each of die elements 412, which is where ejection members 413 are located. Depending upon the lengths of extractor elements 422, end areas of extractor elements 422 may pass through blank 401 and pierce ejection members 413 during this operation. In order to ensure that die elements 412 properly align with extractor elements 422, registration pegs 414 are aligned with and enter registration apertures 423.

Figure 10A:
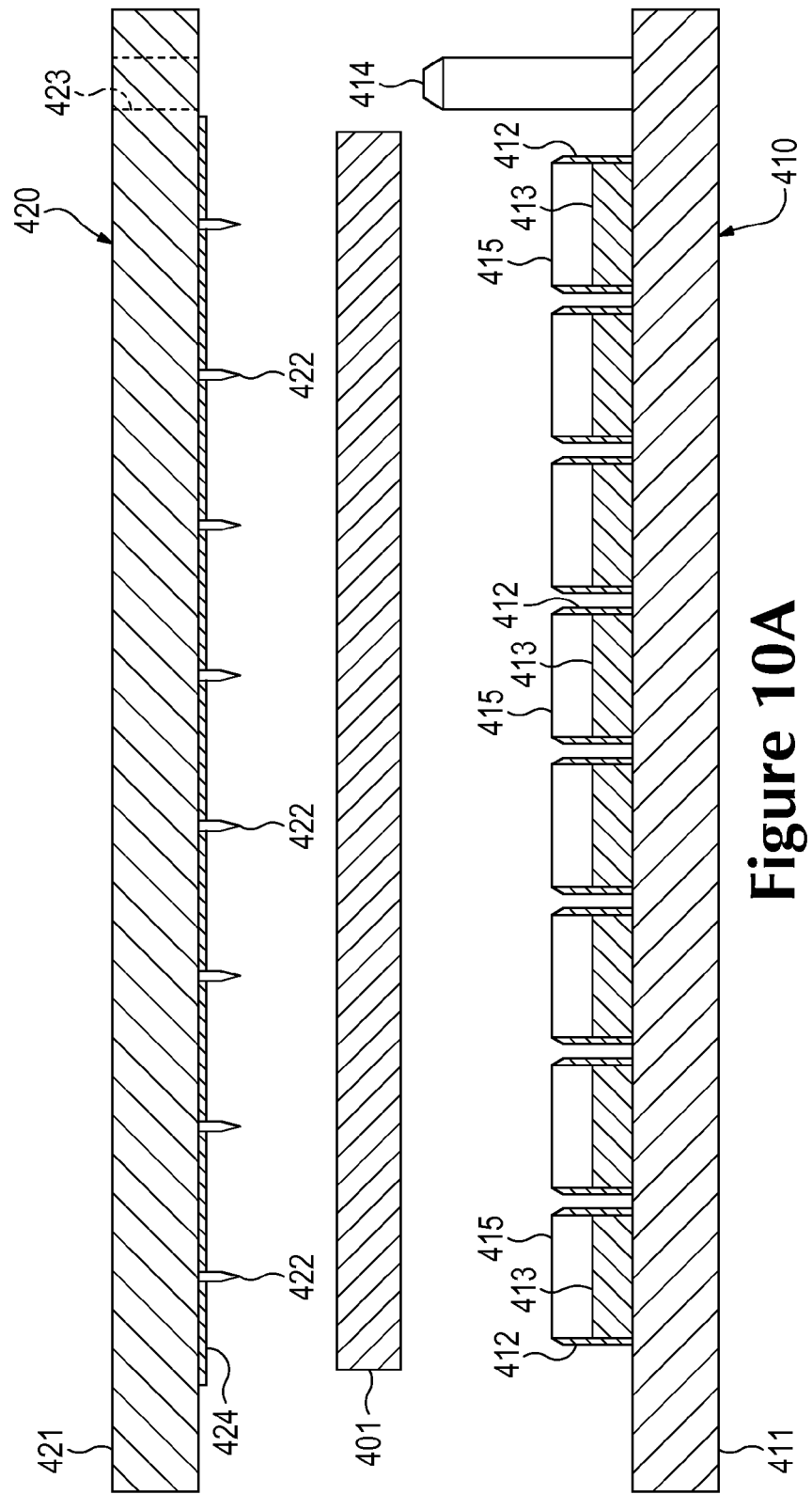
Figure 10B:
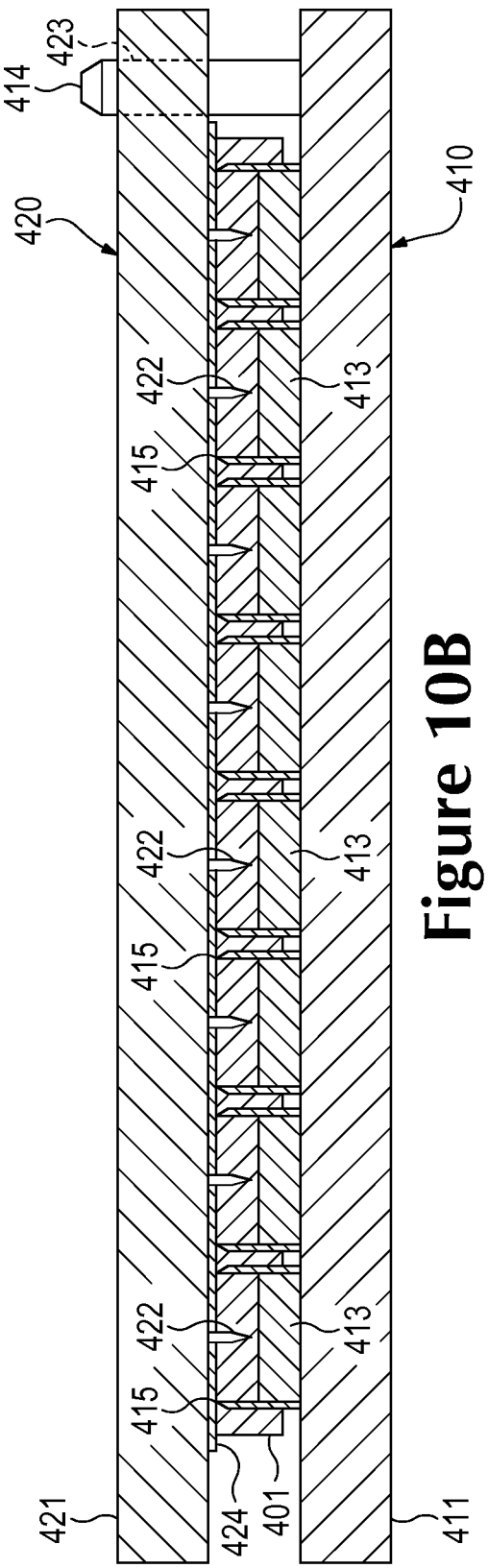
Figure 10C:
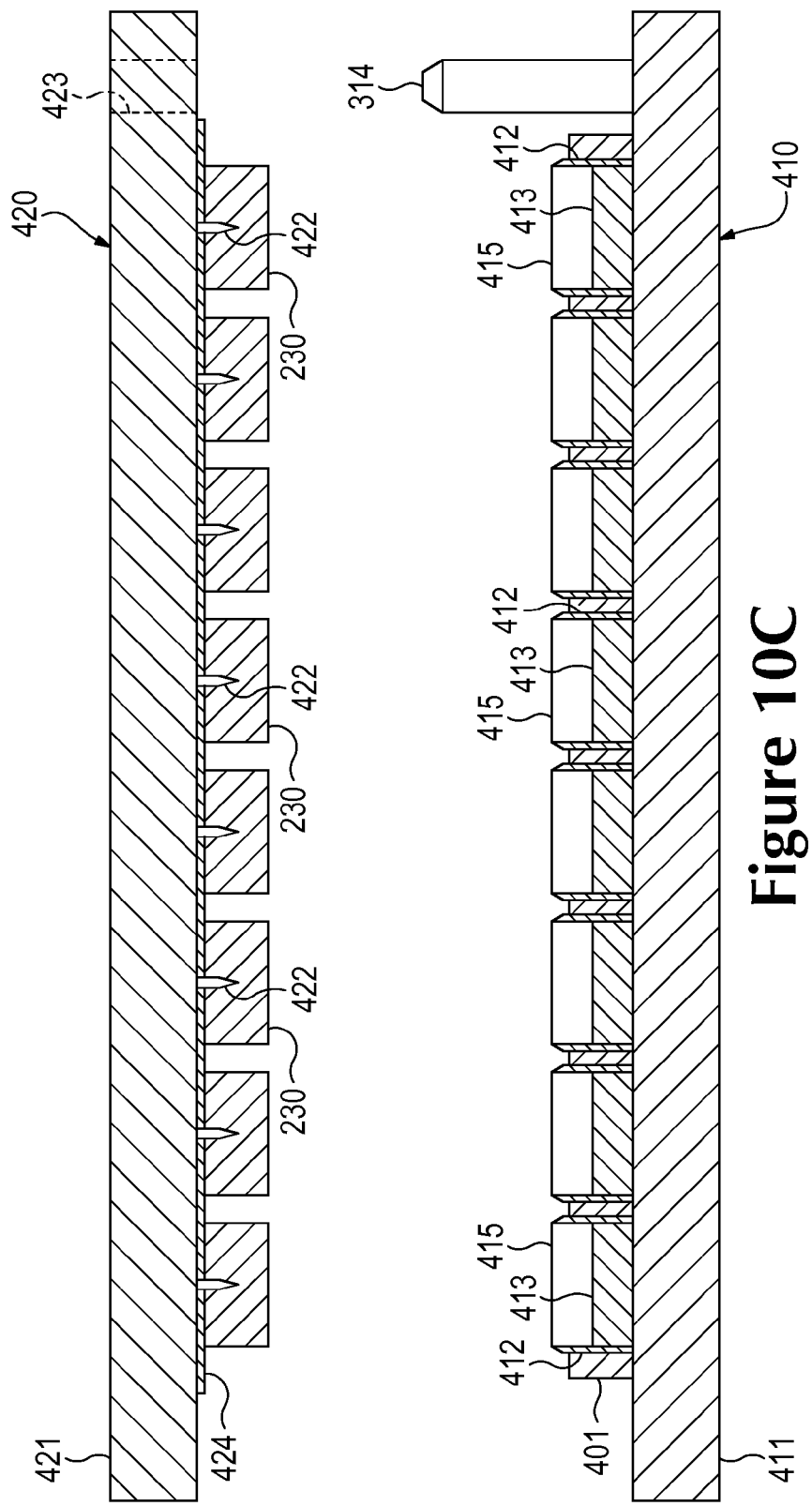

At this stage of the process, die elements 412 have effectively cut through blank 401. Referring to FIG. 10B, edges 415 of die elements 412 pass entirely through blank 401 to rest against a surface of extractor sheet 424. As noted above, the interior area of each die element 412 has the general shape of an individual pad component 230. Accordingly, the individual pad components 230 are located within die elements 412 and are compressed between a surface of extractor sheet 424 and ejection members 413. As depicted in FIGS. 9C and 10C, die 410 and extractor 420 then separate to remove pad components 230 from within die elements 412, and pad components 230 are secured to extractor 420 by the various extractor elements 422. Referring again to FIG. 10B, portions of blank 401 within die elements 412 (i.e., the portions forming pad components 230) are compressed more than portion of blank 401 that are exterior of die elements 412. That is, portions of blank 401 within die elements 412 are compressed against ejection members 413. When die 410 and extractor 420 separate, the compression of pad components 230 causes pad components 230 to expand outward from die elements 412 and remain properly positioned on extractor elements 422. As a result, pad components 230 remain secured to extractor elements 422 upon the separation of die 410 and extractor 420.

Additionally, note that blank 401 may remain within die 410 (i.e., around the various die elements 412) at this stage, or may be separated from die 410, and also that blank 401 defines various apertures where pad components 230 were removed.

As a summary of the manufacturing process up to this point, pad components 230 have effectively been removed from blank 401. More particularly, (a) die elements 412 were utilized to cut through blank 401 to form pad components 230 and (b) pad components 230 are removed from die elements 412 and remain secured to extractor 420 due to the presence of extractor elements 422, which extend into the various pad components 230. Additionally, pad components 230 are positioned and oriented in the same manner as die elements 412 and are, therefore, positioned and oriented as within cushioning element 200. Accordingly, pad components 230 have been removed from blank 401 and are positioned and oriented to be incorporated into cushioning element 200.

Figure 9D:
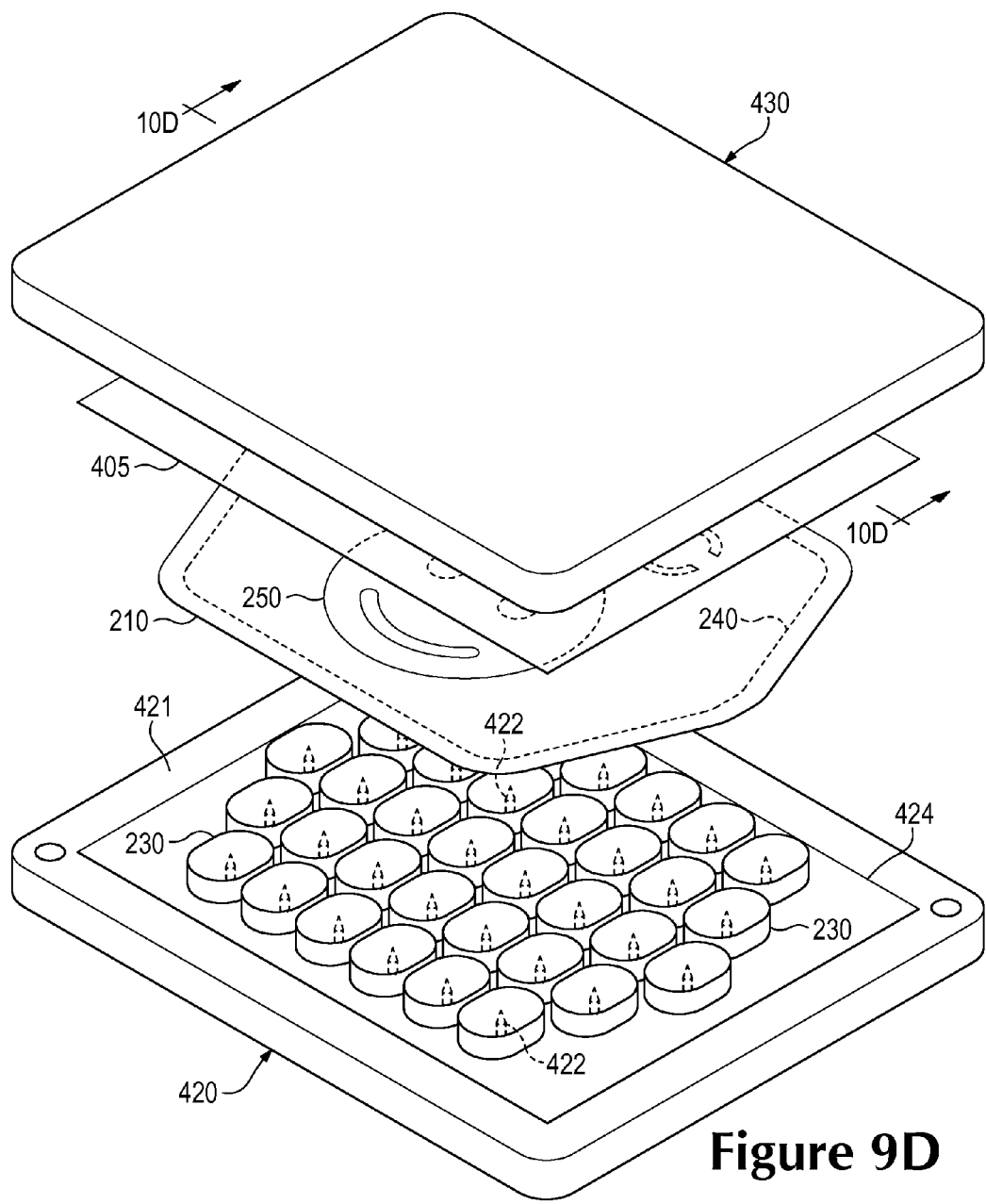
Figure 10D:
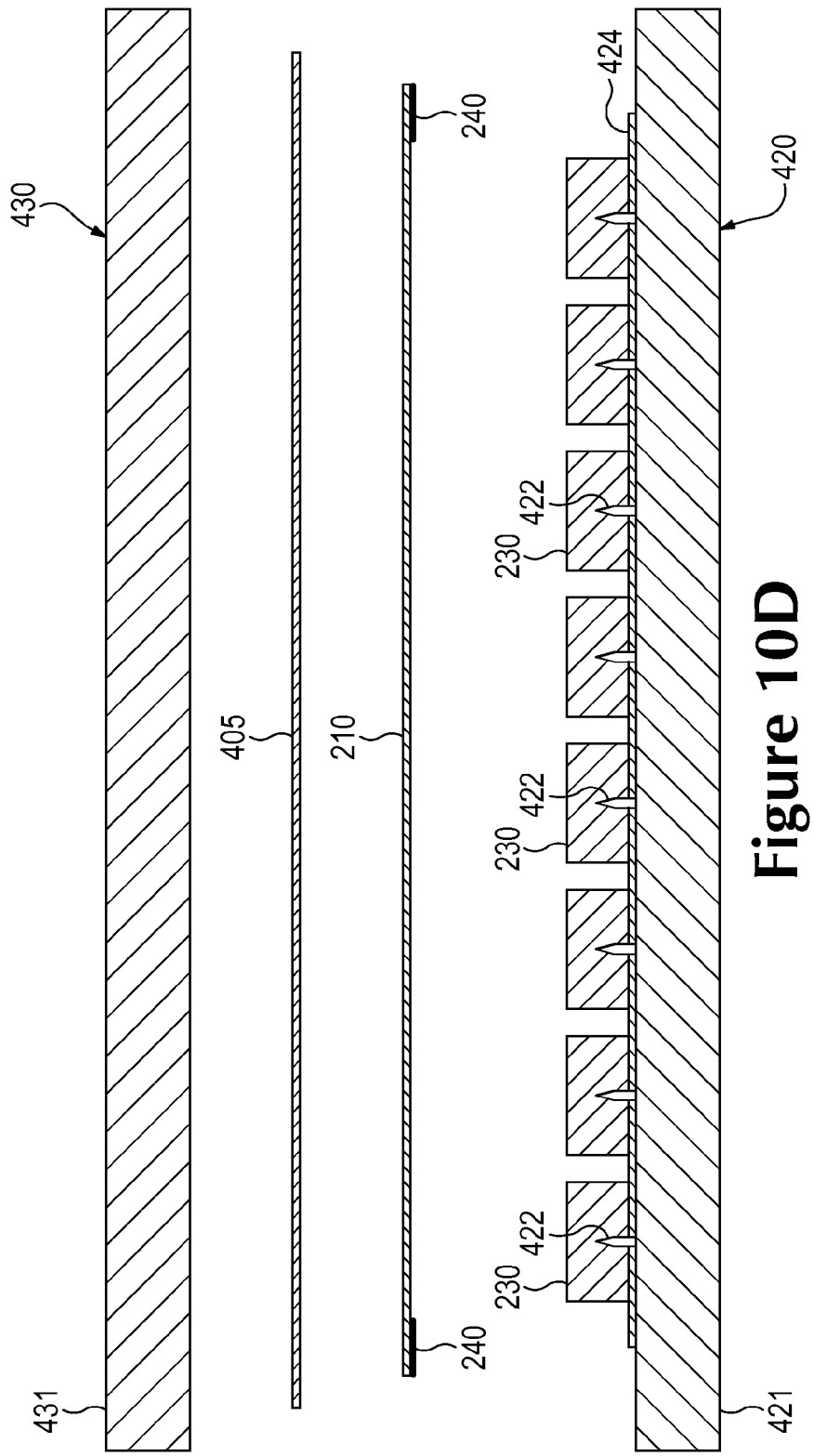

The combination of extractor 420 and pad components 230 is then positioned adjacent to first material layer 210, as depicted in FIGS. 9D and 10D. First material layer 210 includes bonding element 240 and indicia 250. First material layer 210 is positioned adjacent to dye retention layer 405, and dye retention layer 405 is positioned adjacent to heating plate 430. Accordingly, first material layer 210 is located between the combination of extractor 420 and pad components 230 and dye retention layer 405, and dye retention layer 405 is located between first material layer 210 and heating plate 430.

Dye retention layer 405 may be a sheet of material incorporating one or more layers of dye-resistant material. For example, dye retention layer 405 may be a wax paper or a release paper. Alternatively, dye retention layer 405 may be a sheet of material having one or more plasticized surfaces. As a further alternative, dye retention layer 405 may be a polymer sheet. Dye retention layer 405 may be any sheet having a surface to which dyes used in dye-sublimation printing processes do not adhere, or any sheet having a surface that does not absorb dyes used in dye-sublimation printing processes, or any sheet having a surface to which dyes used in dye-sublimation printing processes otherwise do not transfer.

Figure 9E:
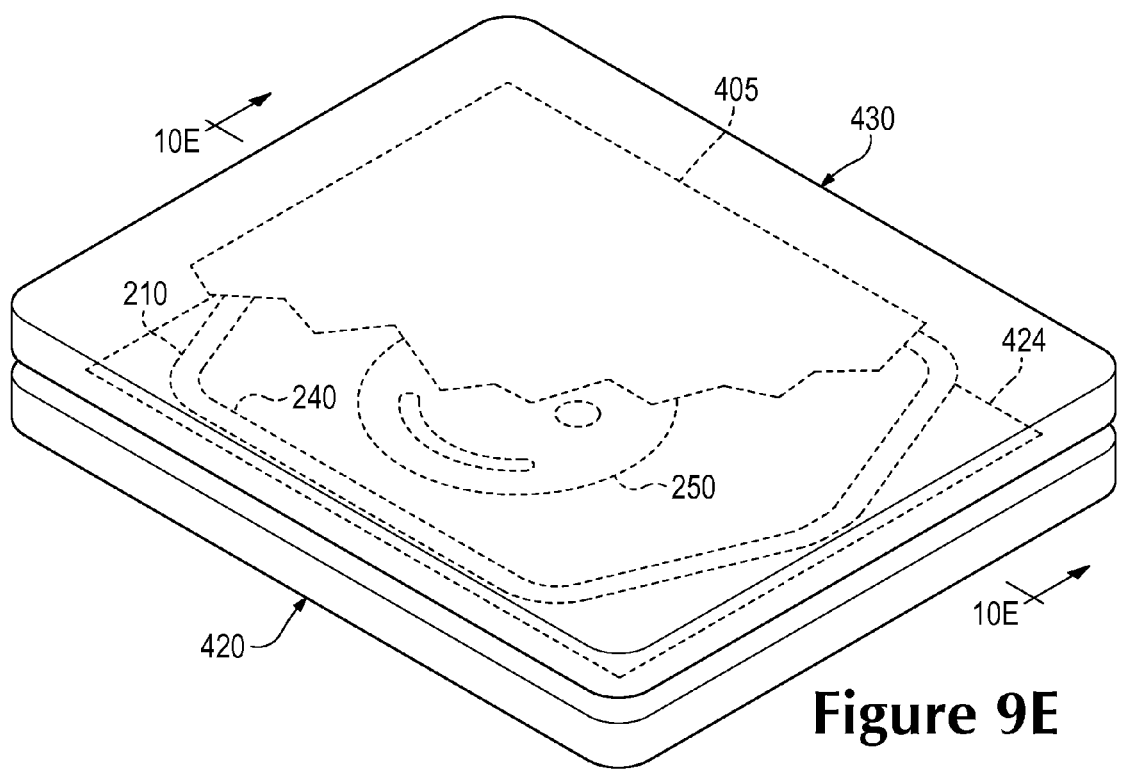
Figure 10E:
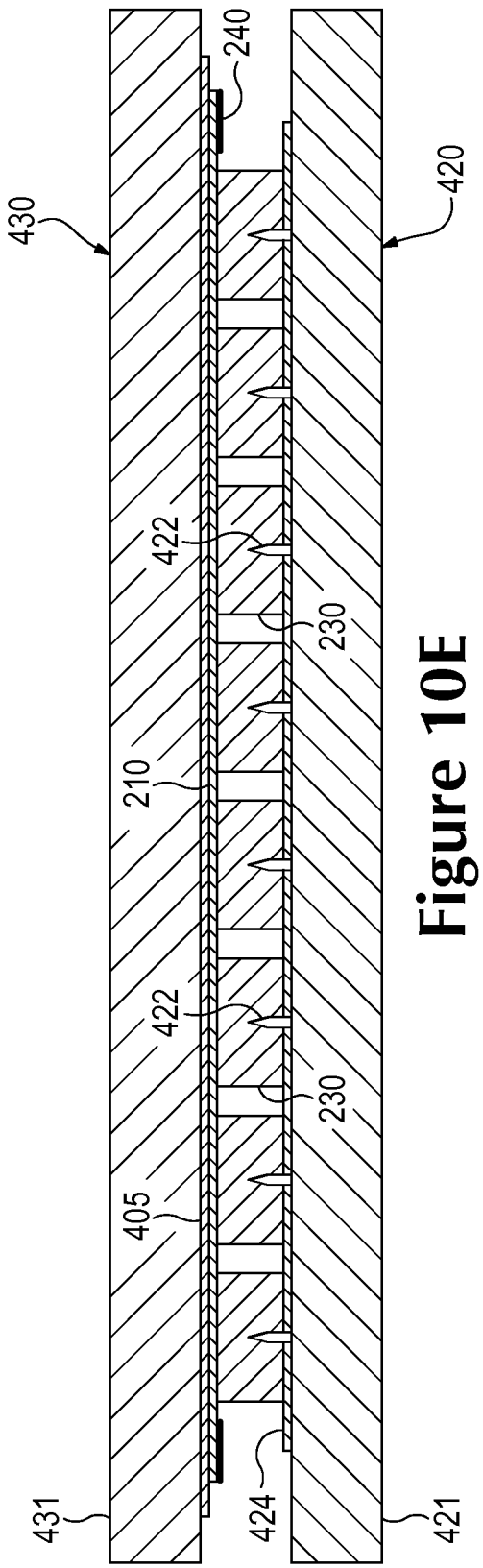

Extractor 420 and heating plate 430 then close upon and compress pad components 230, first material layer 210, and dye retention layer 405, as depicted in FIGS. 9E and 10E. As discussed above, base 431 of heating plate 430 incorporates heating elements. As such, the temperature of base 431 may be elevated to a point where bonding (e.g., thermalbonding) occurs between first material layer 210 and pad components 230. Dye retention layer 405 may inhibit the movement of dye away from first material 210 during the thermalbonding step. For example, dye retention layer 405 may inhibit the transfer of re-sublimated dye away from first material 210.

When compressed between extractor 420 and heating plate 430, energy from heating plate 430 may be utilized to bond first material layer 210 and pad components 230 to each other. As discussed above, a thermoplastic polymer material melts when heated and returns to a solid state when cooled sufficiently. Based upon this property of thermoplastic polymer materials, thermalbonding processes may be utilized to form a thermalbond that joins first material layer 210 are pad components 230. In this context, thermalbonding may involve, for example, (a) the melting or softening of thermoplastic materials within either of first material layer 210 and pad components 230 that joins the elements together, (b) the melting or softening of a thermoplastic material within pad components 230 such that the thermoplastic polymer material extends into or infiltrates the structure of a textile utilized for first material layer 210, or (c) the melting or softening of a thermoplastic material within first material layer 210 such that the thermoplastic polymer material extends into or infiltrates the structure of pad components 230.

Thermalbonding may occur when only one element includes a thermoplastic polymer material or when both elements include thermoplastic polymer materials. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, an adhesive, a thermally-activated adhesive, or other securing structure may be utilized to join first material layer 210 and pad components 230.

As discussed above, a surface of base 431 that contacts portions of cushioning element 200 during the manufacturing process may incorporate a rubber or silicone material. Referring to FIG. 10E, extractor elements 422 are spaced from and do not contact base 431. In situations where the compression of first material layer 210 and pad components 230 induces extractor elements 422 to contact base 431, the rubber or silicone material may be present to receive end areas of extractor elements 422. That is, the end areas of extractor elements 422 may pierce and enter the rubber or silicone material during the compression of first material layer 210 and pad components 230.

Figure 9F:
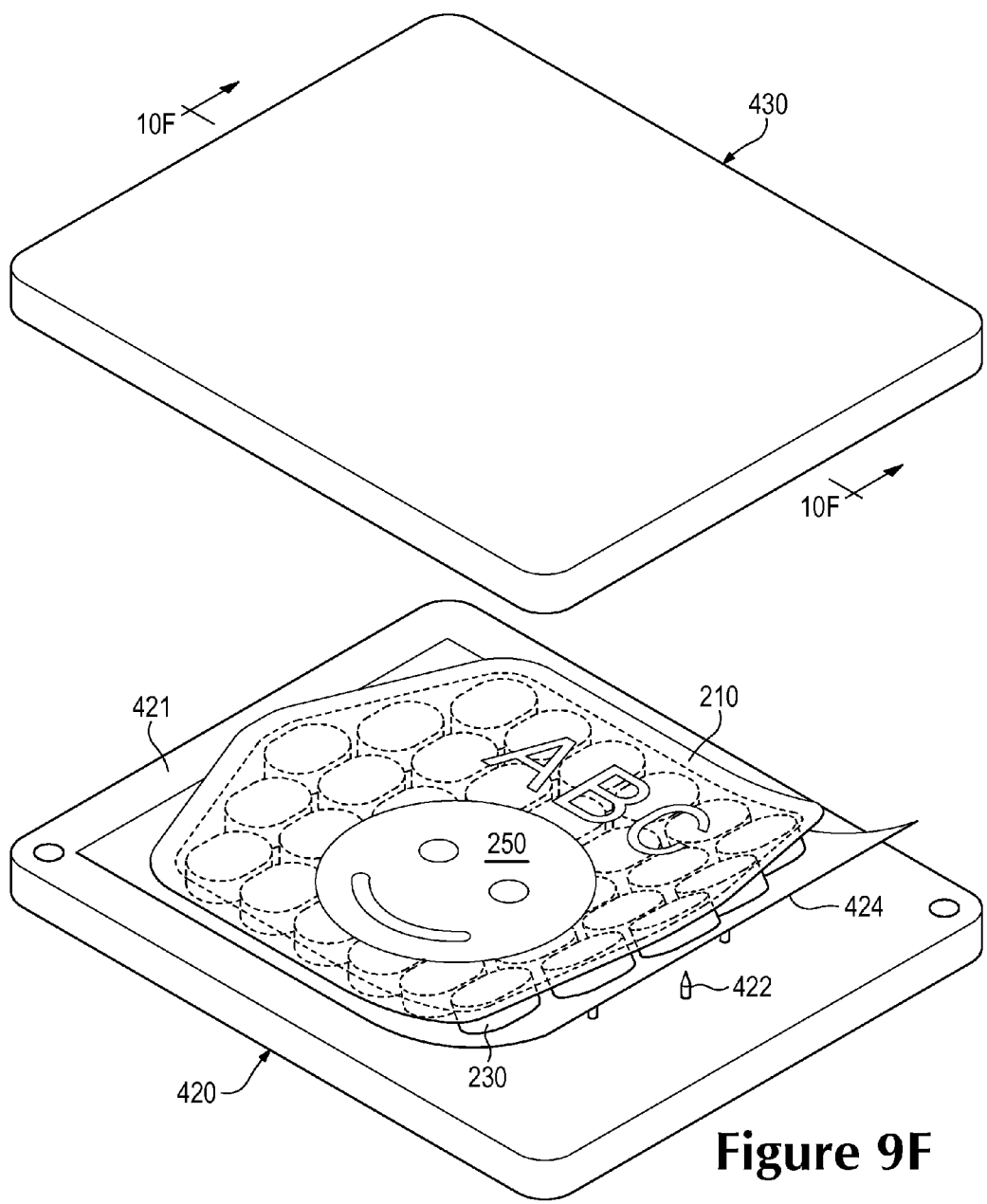
Figure 9G:
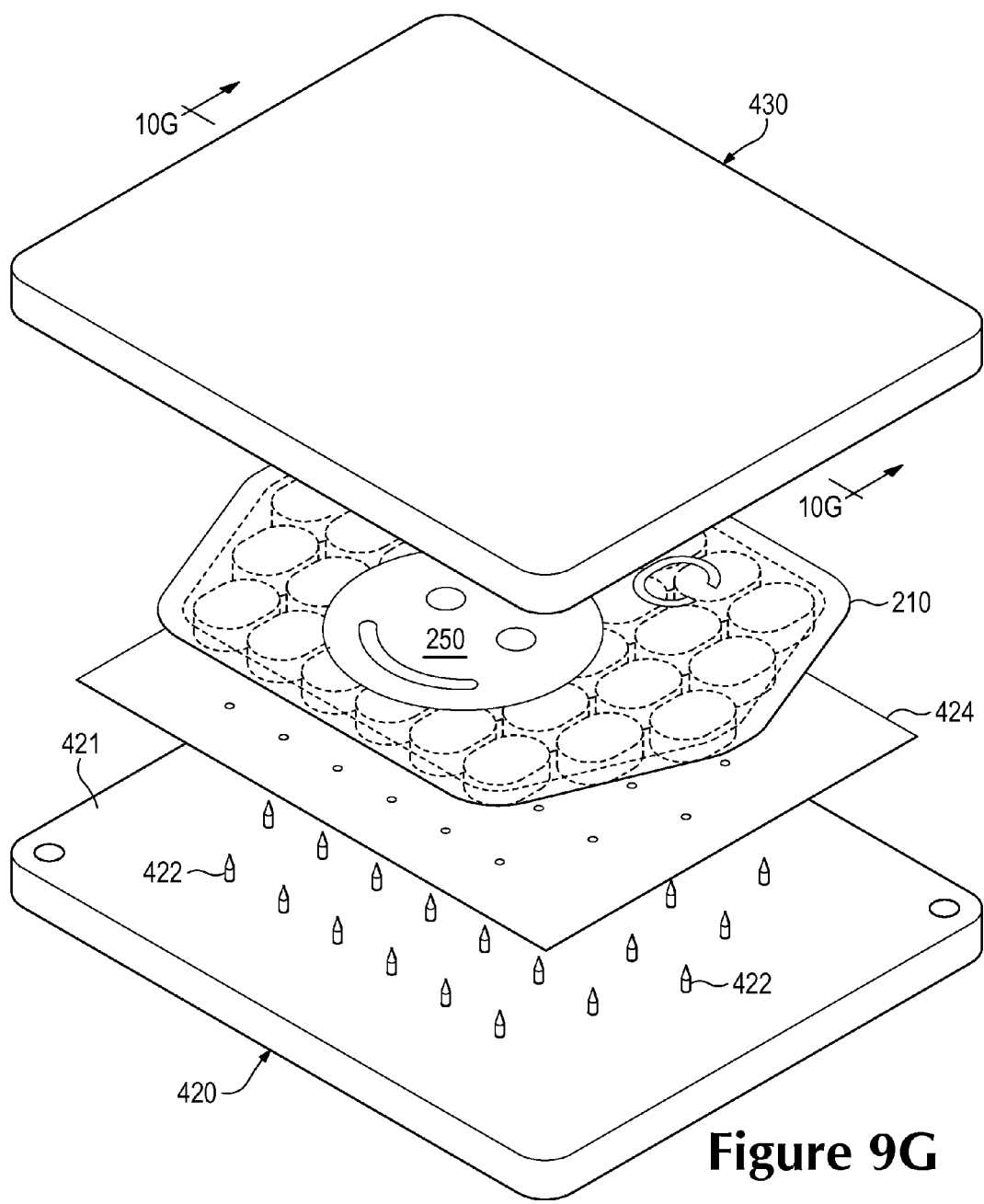
Figure 10F:
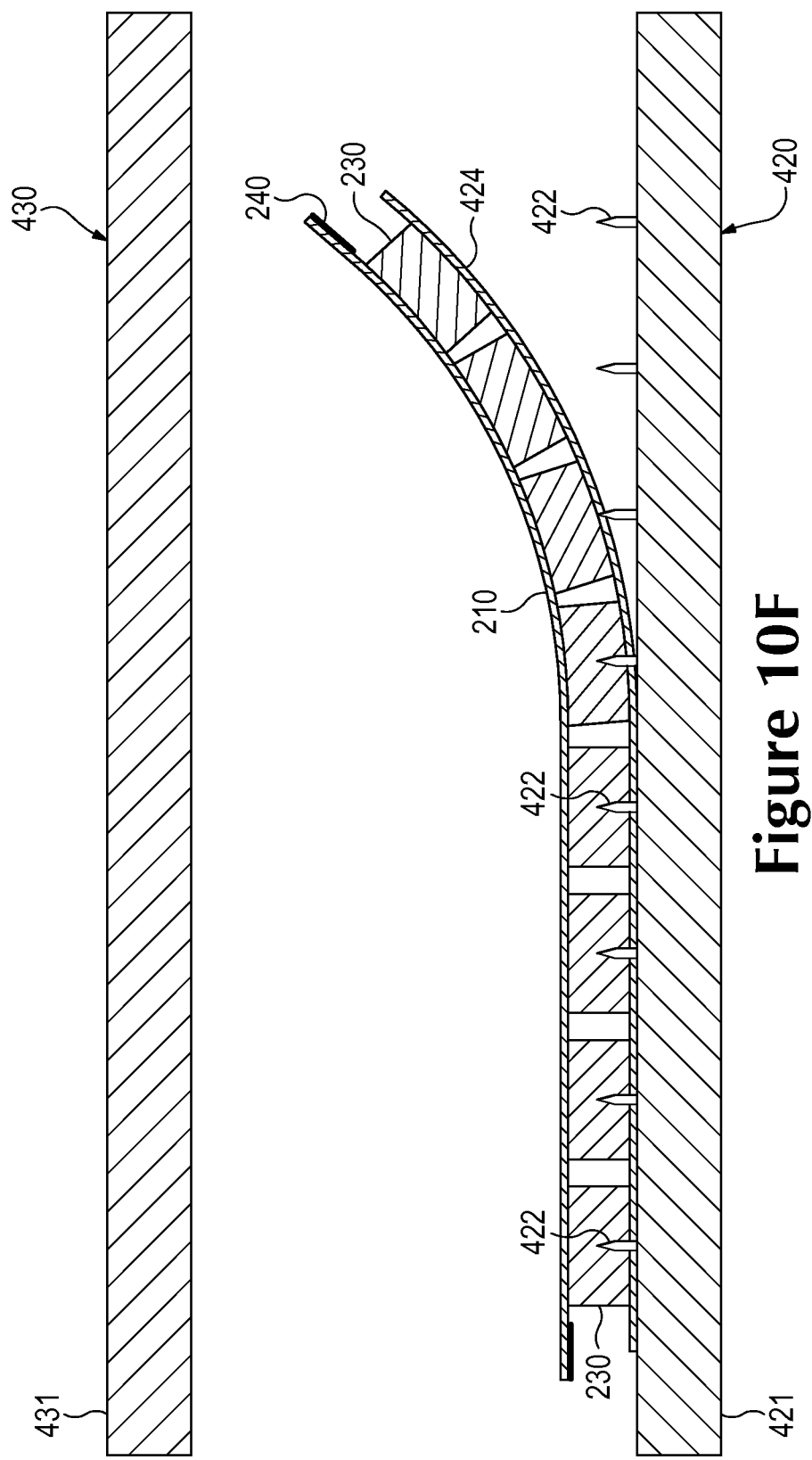
Figure 10G:
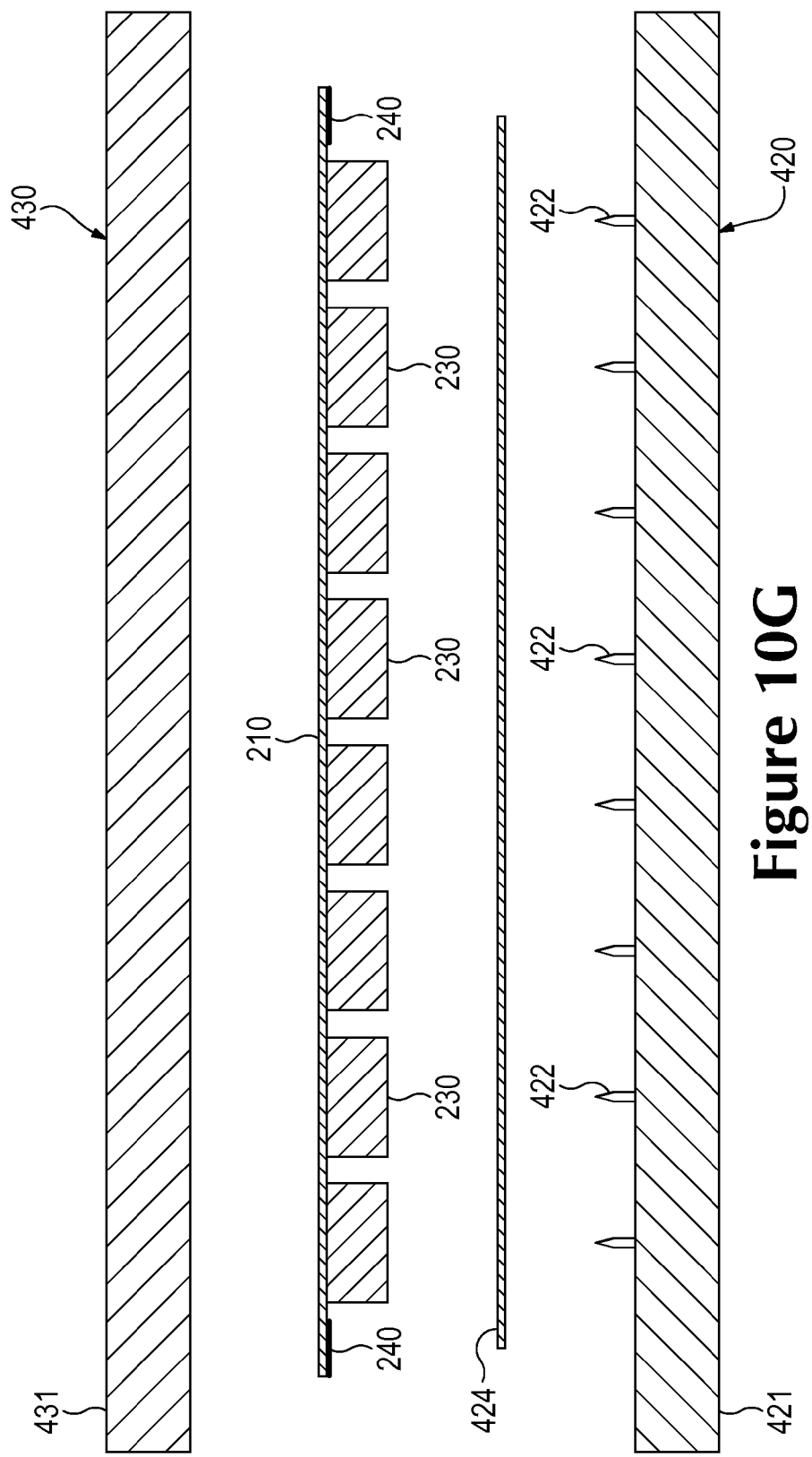

Following compression and bonding, extractor 420 and heating plate 430 separate to expose the bonded first material layer 210 and pad components 230. At this stage, the thermoplastic material, adhesive, or other element that joins first material layer 210 and pad components 230 may have an elevated temperature or may not be fully cured. In order to prevent separation between first material layer 210 and pad components 230, extractor sheet 424 may be pulled from base 421, which effectively pushes pad components 230 from extractor elements 422, as depicted in FIGS. 9F and 10F. That is, extractor sheet 424 is separated from extractor elements 422 to push pad components 230 from extractor 420. Upon fully separating extractor sheet 424 from extractor elements 422, the combination of first material layer 210 and pad components 230 is free from extractor 420, as depicted in FIGS. 9G and 10G.

Figure 9H:
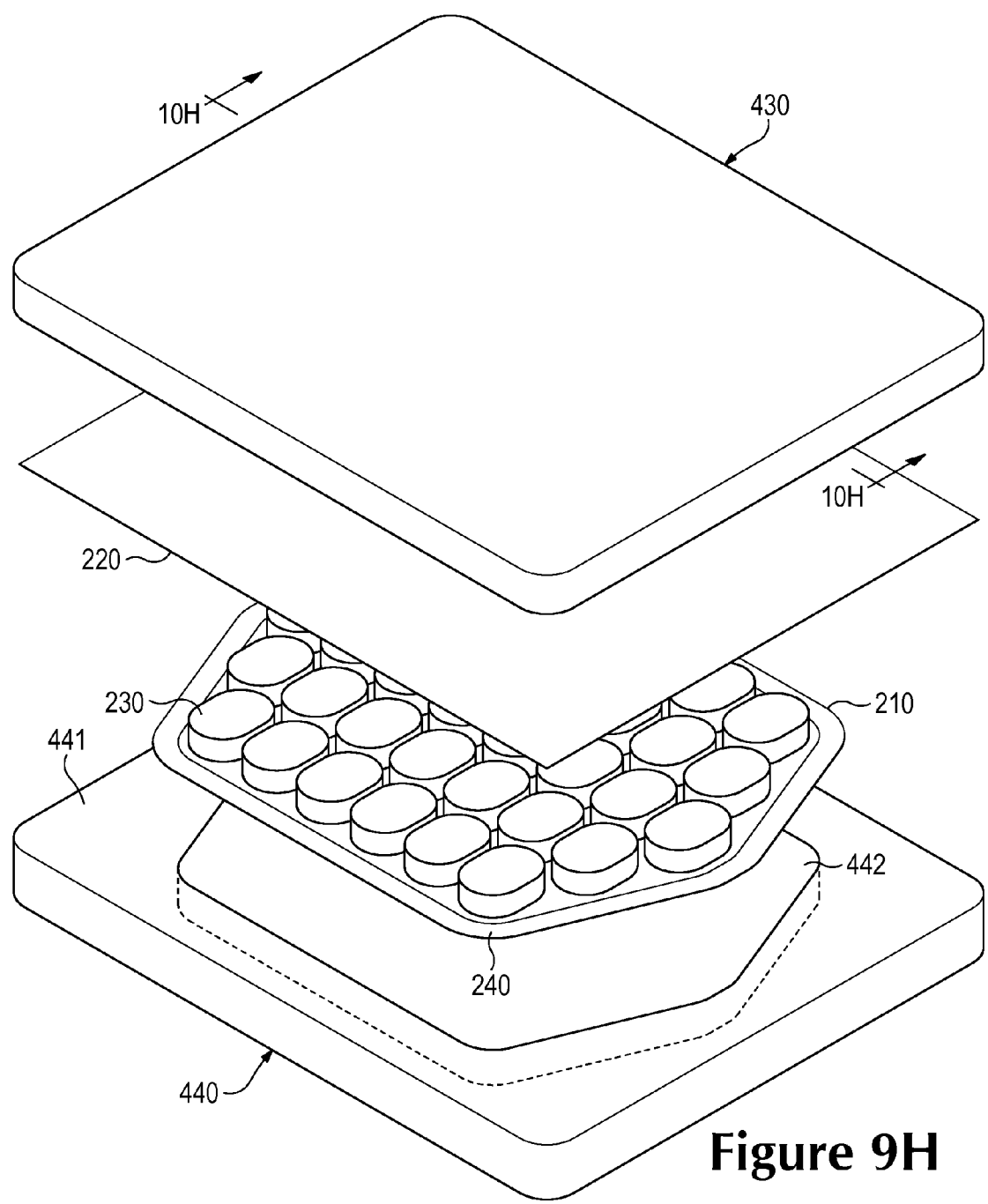
Figure 9I:
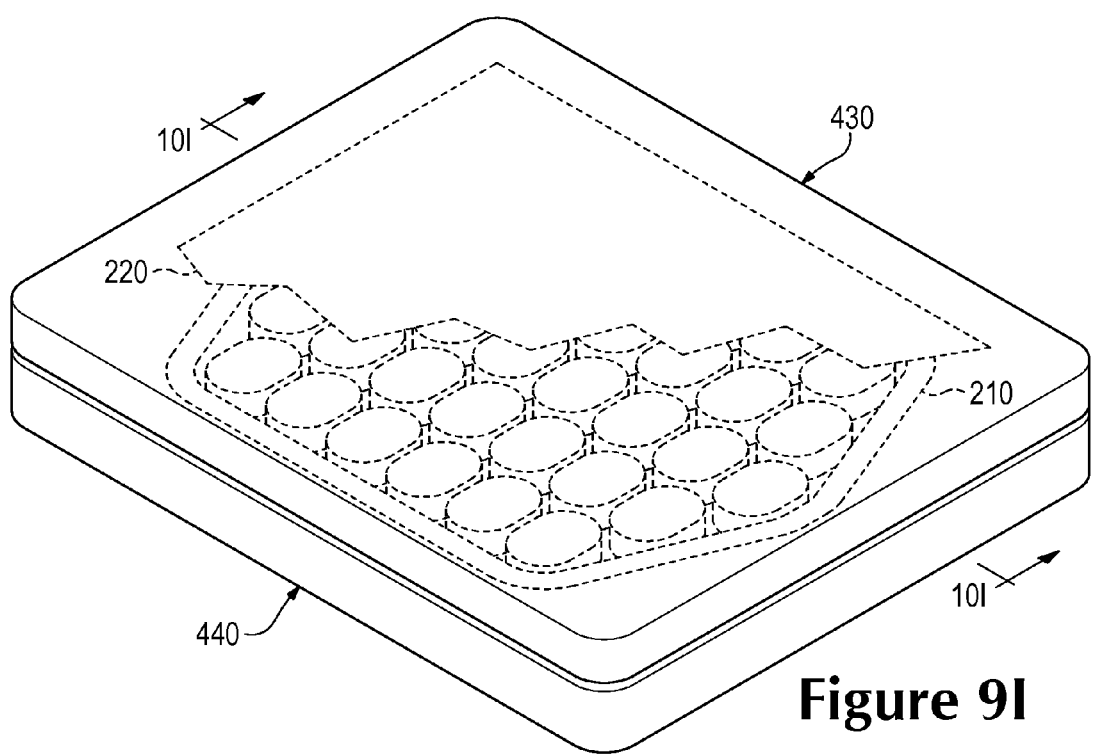
Figure 10H:
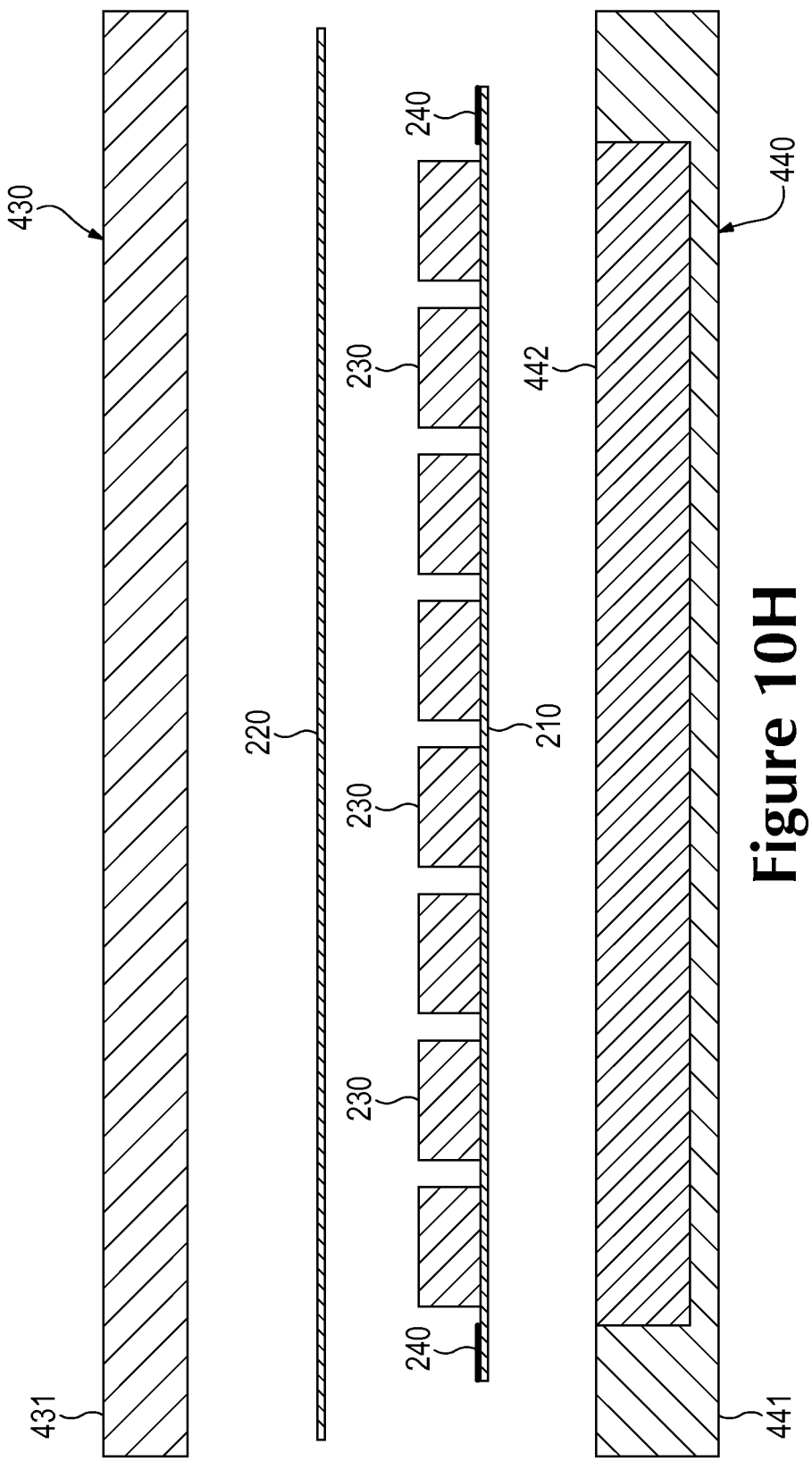
Figure 10I:
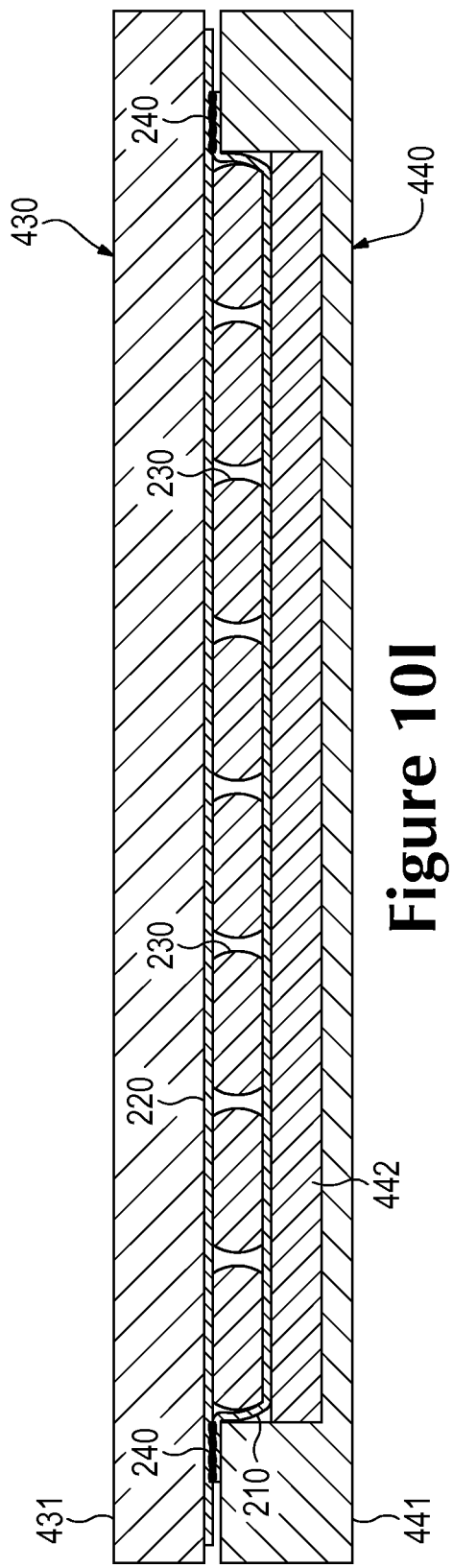

Continuing with the manufacturing of cushioning element 200, second material layer 220 is then placed adjacent to heating plate 430, the combination of first material layer 210 and pad components 230 is turned over or otherwise oriented such that pad components 230 are between material layers 210 and 220, and press plate 440 is located adjacent to first material layer 210, as depicted in FIGS. 9H and 10H. Press plate 440 and heating plate 430 then close upon and compress first material layer 210, second material layer 220, and pad components 230, as depicted in FIGS. 9I and 10I. Given the elevated temperature of base 431, bonding (e.g., thermalbonding) occurs between second material layer 220 and pad components 230.

In addition to bonding second material layer 220 and pad components 230, material layers 210 and 220 are bonded (e.g., thermalbonded) with bonding element 240. Pad components 230 are positioned to correspond with the location of compressible element 442, as depicted in FIG. 10I. When compressed, the thicknesses of pad components 230 and compressible element 442 are reduced, thereby allowing base 431 and base 441 to compress bonding element 240 between material layers 210 and 220. By compressing these elements together, coupled with heat from base 431, second material layer is bonded (e.g., thermalbonded) to bonding element 240. In effect, therefore, material layers 210 and 220 are bonded together with bonding element 240. In configurations where pad components 230 have varying thicknesses, for example, multiple elements of compressible material 442 with different degrees of compressibility may be utilized to ensure that all elements of cushioning element 200 are properly bonded.

Figure 9J:
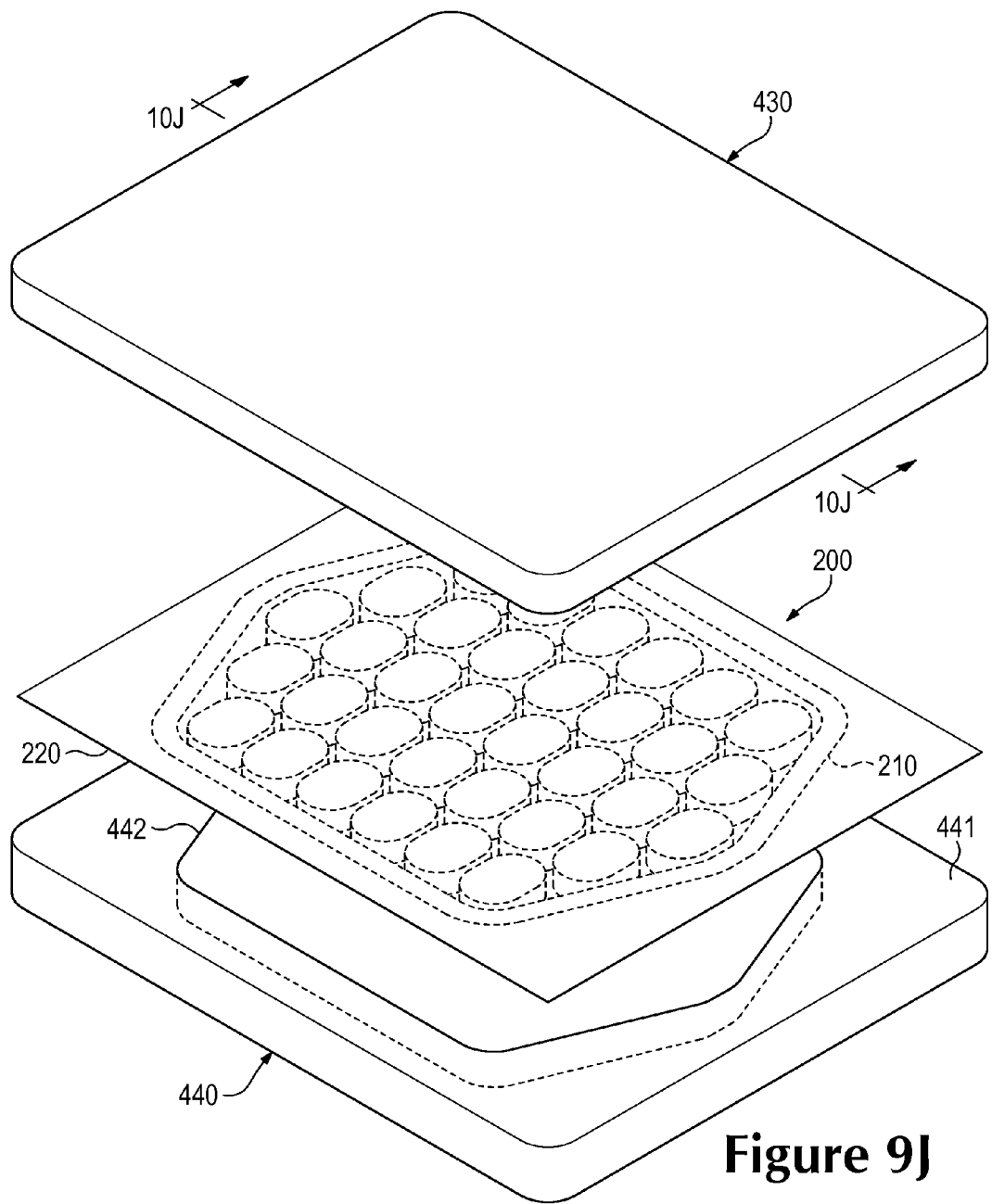

Once compression and bonding are complete, heating plate 430 and press plate 440 separate to (a) expose cushioning element 200 in which first material layer 210, pad components 230, and second material layer 220 are bonded together and (b) remove dye retention layer 405, as depicted in FIGS. 9J and 10J. At this stage of the manufacturing process, the manufacture of cushioning element 200 is effectively complete.

The above discussion of FIGS. 9A-9J and 10A-10J provides an example of a suitable manufacturing process for cushioning element 200. In general, an advantage of the manufacturing process is that the arrangement of die elements 412 determines the resulting arrangement of pad components 230 in cushioning element 200. That is, die 410 is initially set such that die elements 412 are positioned in a particular arrangement, and the resulting positions of pad components 230 effectively mirrors the arrangement of die elements 412. Accordingly, the positions of pad components 230 may be pre-selected through the arrangement of die elements 412.

An additional advantage of the manufacturing process is that all the elements of cushioning element 200 may be joined through thermalbonding without the need for additional manufacturing steps. In some configurations, however, optional stitching, adhesive, or thermalbonding steps may be utilized to supplement the joining of material layers 210 and 220 around the periphery of pad components 230. As an example, a sewing or stitching machine may be utilized to further secure material layers 210 and 220 to each other. Additionally, the sewing or stitching machine may be utilized to incorporate cushioning element 200 into an article of apparel or another article.

Another advantage of the manufacturing process is that various constituent elements of cushioning element 200 may be joined through thermalbonding while accommodating a previous dye-sublimation printing step. In particular, by inhibiting the movement of dye away from first material 210 in the thermalbonding step, the use of dye retention layer 405 may advantageously improve the final quality of indicia 250, such as custom-ordered indicia, that may already have been transferred to the surface of first material layer 210.

A variety of other manufacturing processes or variations of the manufacturing process discussed above may also be utilized. In some alternate configurations, optional stitching, adhesive, or thermalbonding steps may be utilized to supplement the joining of material layers 210 and 220 of cushioning element 200. For example, a sewing or stitching machine may be utilized to further secure material layers 210 and 220 to each other around the periphery of cushioning element 200. Additionally, a sewing or stitching machine may be utilized to incorporate cushioning element 200 into an article of apparel or another article.

Additionally, extractor elements 422 may retract such that extractor 420 may also be utilized as press plate 440. In other configurations, ejection members 413 may be absent or a mechanized ejector may be utilized within die elements 412.

Moreover, extractor elements 422 may be removable or positioned in various locations to allow different configurations of pad components 230. Moreover, specialized machinery may be formed to automate the general manufacturing process discussed above.

As a further matter, extractor 420 and press plate 440 are depicted as being located below heating plate 430 in various steps. An advantage to this configuration relates to the positioning of elements forming cushioning element 200. More particularly, when extractor 420 and press plate 440 are below heating plate 430, the elements forming cushioning element 200 may be arranged or otherwise positioned on extractor 420 and press plate 440 prior to the application of heat from heating plate 430. In this configuration, heat is applied to the elements of cushioning element 200 only when heating plate 430 compresses the elements against either extractor 420 or press plate 440. Accordingly, the elements forming cushioning element 200 may be arranged in the absence of applied heat in configurations where heating plate 430 is above extractor 420 and press plate 440.

Apparel and Other Product Configurations

Figure 11:
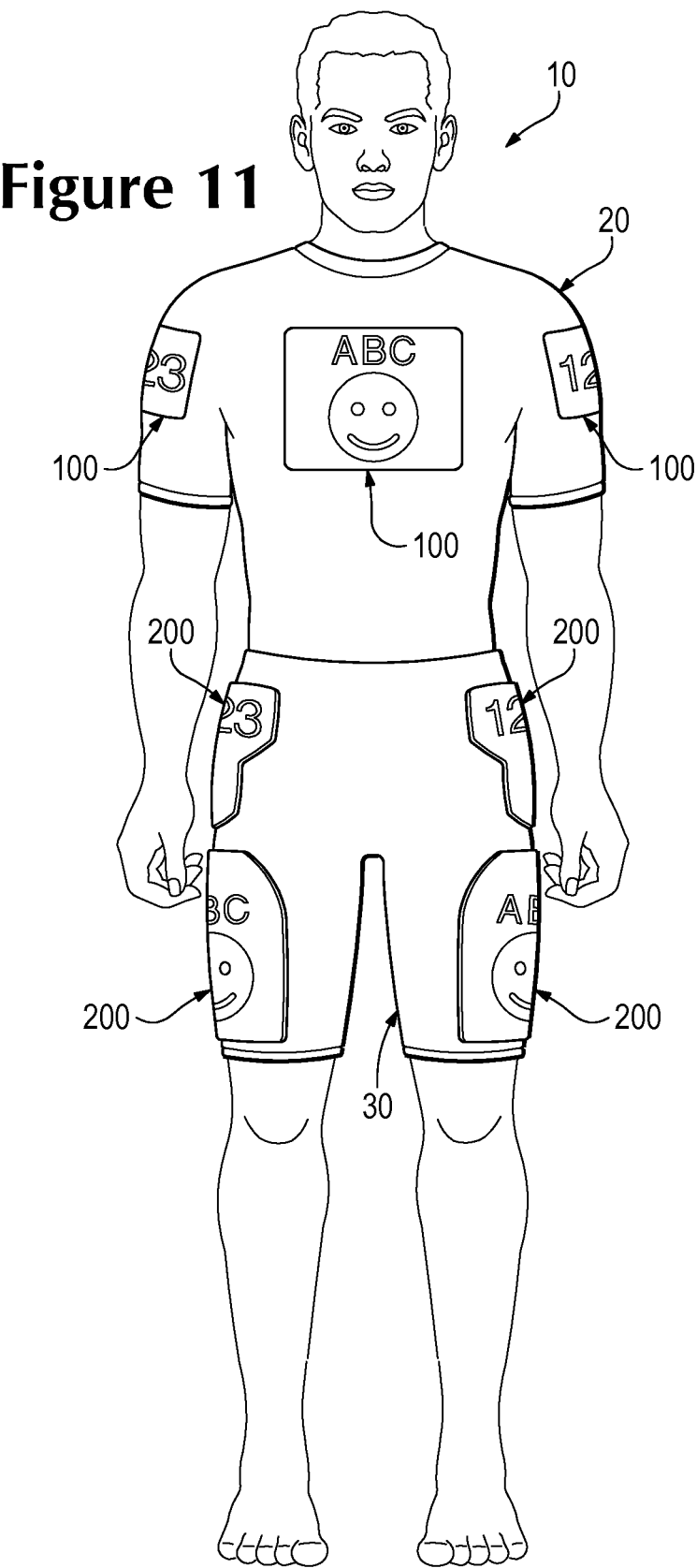
FIG. 11 is a front elevational view of an individual wearing articles of apparel incorporating further configurations of the printed element and the cushioning element.

With reference to FIG. 11, an individual 10 is depicted as wearing a first article of apparel 20 with the general configuration of a shirt-type garment and a second article of apparel 30 with the general configuration of a shorts-type garment. Although articles of apparel 20 and 30 are depicted as being exposed, articles of apparel 20 and 30 may be worn under other articles of apparel, may be worn over other articles of apparel, or may be worn alone.

Although depicted as having the general configurations of a shirt-type garment and a shorts-type garment, articles of apparel 20 and 30 may have the general configuration of any type of garment or apparel covering other areas of individual 10. For example, articles of apparel 20 and 30 may have the general configuration of pants, skirts, dresses, robes, long-sleeved shirts, short-sleeved shirts, tank tops, underclothes, jackets, coats, hats, wraps, footwear, socks, gloves, scarves, shawls, or stoles. As a further example, articles of apparel 20 and 30 may have the general configuration of apparel used in athletic activities, such as sports gloves or helmets.

Additionally, articles of apparel 20 and 30 are separate, i.e., article of apparel 20 may be worn without article of apparel 30, and article of apparel 30 may be worn without article of apparel 20. However, in some configurations, articles of apparel 20 and 30 may be the same article. Articles of apparel 20 and 30 may also be worn in combination with other pieces of equipment (e.g., athletic or protective equipment). Accordingly, the configuration of articles of apparel 20 and 30 and the manner in which articles of apparel 20 and 30 are worn by individual 10 may vary significantly.

When worn, article of apparel 20 includes (a) exterior surfaces that face away from individual 10 and (b) opposite interior surfaces that face toward individual 10 and may contact individual 10. A plurality of printed elements 100 are incorporated into various areas of article of apparel 20. Printed elements 100 may be incorporated into article of apparel 20 in a variety of ways. For example, first material layer 110 of a printed element 100 may form a portion of an exterior surface of an article of apparel, and second material layer 120 may form a portion of both an exterior surface and an interior surface of the article of apparel. For example, second material 120 may be a portion of a base material of article of apparel 20. Alternatively, first material layer 110 of a printed element 100 may form a portion of both an exterior surface and an interior surface of an article of apparel. For example, first material layer 110 may extend over an aperture in second material layer 120.

Similarly, when worn, article of apparel 30 includes (a) exterior surfaces that face away from individual 10 and (b) opposite interior surfaces that face toward individual 10 and may contact individual 10. A plurality of cushioning elements 200 are incorporated into various areas of article of apparel 30 to impart padding, cushioning, or otherwise attenuate impact forces. Cushioning elements 200 may be incorporated into article of apparel 30 in a variety of ways. For example, first material layer 210 may be positioned exterior of second material element 220, such that cushioning element 200 protrudes outward from article of apparel 30. That is, first material layer 210 may form a portion of an exterior surface of article of apparel 30, whereas second material layer 220 may form a portion of both an exterior surface and an interior surface of article of apparel 30. Alternately, first material layer 210 may form a portion of both an exterior surface and an interior surface of article of apparel 30, whereas second material layer 220 form a portion of an interior surface of article of apparel 30.

Although first article of apparel 20 is depicted as incorporating printed elements 100 and second article of apparel 30 is depicted as incorporating cushioning elements 200, either printed elements 100 or cushioning elements 200 may be otherwise incorporated into articles of apparel 20 and 30. For example, article of apparel 20 may incorporate printed elements 100, or cushioning elements 200, or both. Similarly, article of apparel 30 may incorporate printed elements 100, or cushioning elements 200, or both.

A variety of techniques may be used to incorporate printed elements 100 and cushioning elements 200 into articles of apparel 20 and 30. For example, printed elements 100 and cushioning elements 200 may be bonded to other materials forming articles of apparel 20 and 30. Alternatively, printed elements 100 and cushioning elements 200 may be stitched or otherwise secured to other materials forming articles of apparel 20 and 30.

When article of apparel 30 is worn during athletic activities, cushioning elements 200 may protect individual 10 from contact with other athletes, equipment, or the ground. Cushioning elements 200 may be positioned in various areas of the articles of apparel to protect specific portions (e.g., muscles, bones, joints, impact areas) of individual 10. Additionally, the shapes, sizes, and other properties of cushioning elements 200, as well as the materials and components utilized in cushioning elements 200, may vary significantly to provide a particular level of protection to the specific portions of individual 10.

In addition to attenuating impact forces, cushioning element 200 has an advantage of simultaneously providing one or more of breathability, flexibility, a relatively low overall mass, and launderability. When incorporated into an article of apparel, such as article of apparel 30, a wearer may perspire and generate excess heat. By utilizing a permeable textile for material layers 210 and 220 and also forming gaps between adjacent pad components 230, areas for air to enter article of apparel 30 and for moisture to exit article of apparel 30 are formed through cushioning element 200. More particularly, air and moisture may pass through material layers 210 and 220 and between pad components 230 to impart breathability to areas of article of apparel 30 having cushioning element 200. Moreover, the materials and structure discussed above for cushioning element 200 impart flexibility and a low overall mass to cushioning element 200. Furthermore, the materials and structure discussed above for cushioning element 200 permits cushioning element 200 to be laundered without significant shrinkage or warping, even when temperatures associated with commercial laundering processes are utilized. Accordingly, cushioning element 200 may simultaneously provide impact force attenuation, breathability, flexibility, a relatively low overall mass, and launderability to an article of apparel.

Furthermore, both printed elements 100 and cushioning elements 200 incorporated into various articles of apparel may advantageously incorporate various indicia, which may be custom-ordered, for various purposes including aesthetic enhancement, identification, or communication. The print quality of such indicia may be improved relative to the print quality present on other printed elements.

Printed elements 100 and cushioning elements 200 may be configured to have any size or shape, or any location on articles of apparel 20 and 30 or other products. For example, in various configurations, printed elements 100 and cushioning elements 200 may be incorporated into mats, pads, cushions, backpacks, tents, screens, banners, or flags. Accordingly, various configurations of printed elements 100 and cushioning elements 200 may be incorporated into a variety of products.

Further Cushioning Element Configurations and Manufacturing Processes

Aspects of first material layers 110 and 210 and second material layers 120 and 220 may vary significantly. As discussed above, material layers 110, 210, 120, and 220 may be formed from various textiles, polymer sheets, leather, synthetic leather, or combinations of materials. For example, any of material layers 110, 210, 120, and 220 may have the configuration of a mesh material that defines a plurality of holes. In addition to imparting greater breathability that allows the transfer of air and moisture, a mesh material may allow for various aesthetic properties.

Aspects of cushioning element 200 may also vary, depending upon the intended use for cushioning element 200 and the product in which cushioning element 200 is incorporated. Moreover, changes to the dimensions, shapes, and materials utilized within cushioning element 200 may vary the overall properties of cushioning element 200. That is, by changing the dimensions, shapes, and materials utilized within cushioning element 200, the compressibility, impact force attenuation, breathability, flexibility, and overall mass of cushioning element 200 may be tailored to specific purposes or products. For example, cushioning elements 200 may have any of the range of configurations depicted and described in U.S. Patent Application Publication Number 2009/0233511, U.S. patent application Ser. No. 12/709,819, and U.S. patent application Ser. No. 12/720,070. Any of these variations, as well as combinations of these variations, may be utilized to tailor the properties of cushioning element 200 to an intended use or particular product. Moreover, any of these variations may be manufactured through the process or variations of the process discussed above.

Figure 12A:
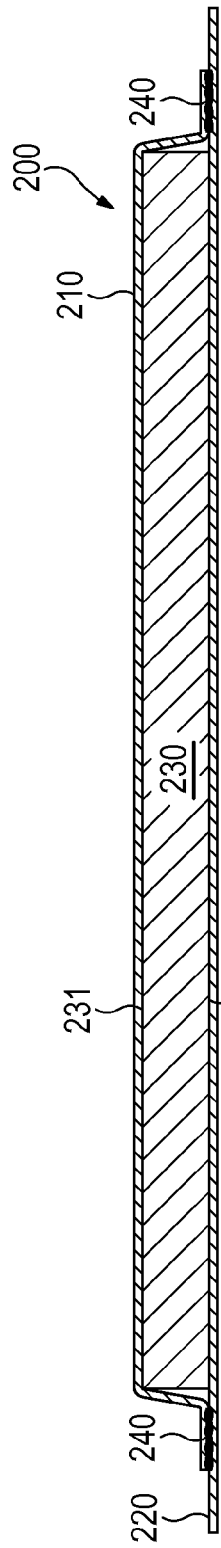

As depicted in FIGS. 3-5B, cushioning element 200 includes a plurality of pad components 230. However, in other configurations, fewer pad components may be present. For example, as depicted in FIG. 12A, cushioning element 200 incorporates a single pad component 230.

Figure 12B:
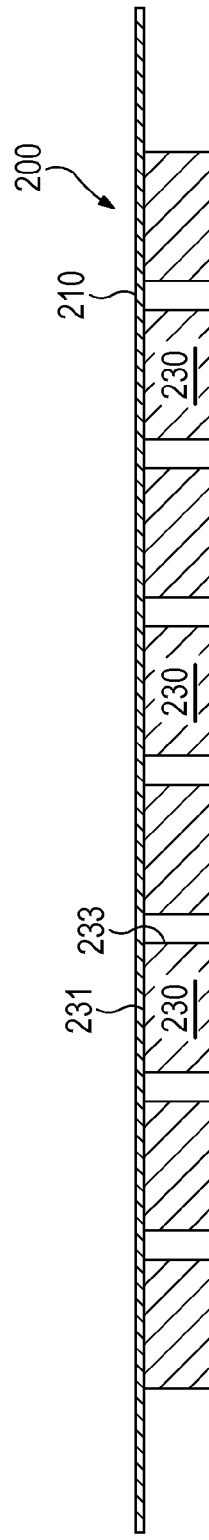
Figure 12C:
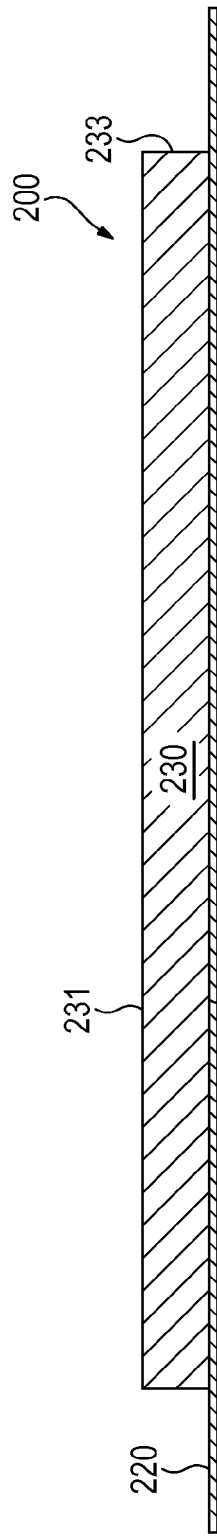

As depicted in FIGS. 3-5B, cushioning element 200 includes a first material layer 210, a second material layer 220, and a plurality of pad components 230 located between material layers 210 and 220. However, in other configurations of cushioning element 200, either of material layers 210 and 220 may be absent. For example, as depicted in FIG. 12B, cushioning element 200 does not include a second material layer 220. In a further example, as depicted in FIG. 12C, cushioning element 200 (which includes a single pad component 230) does not include a first material layer 210.

Figure 12F:
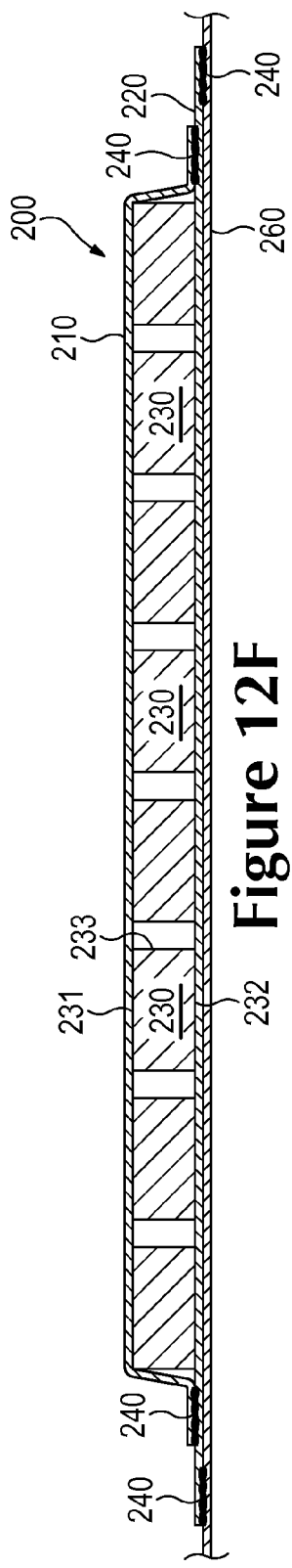
Figure 12G:
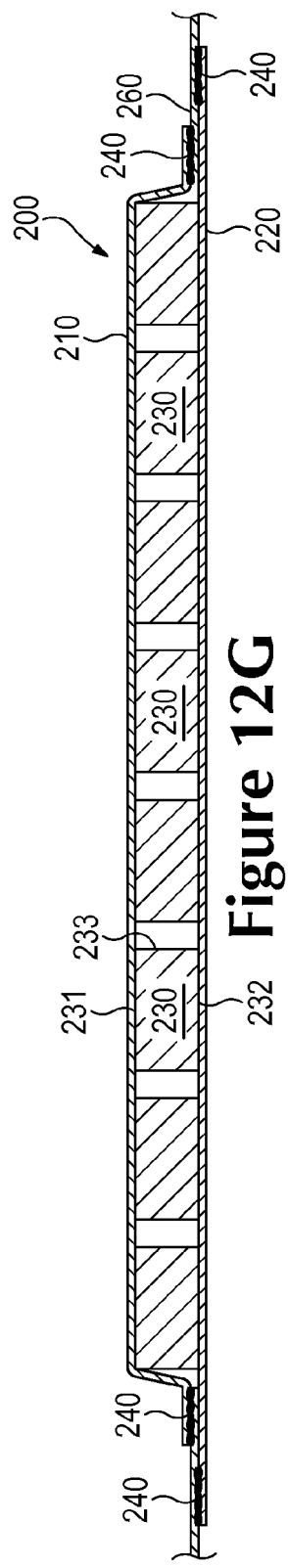
Figure 12H:
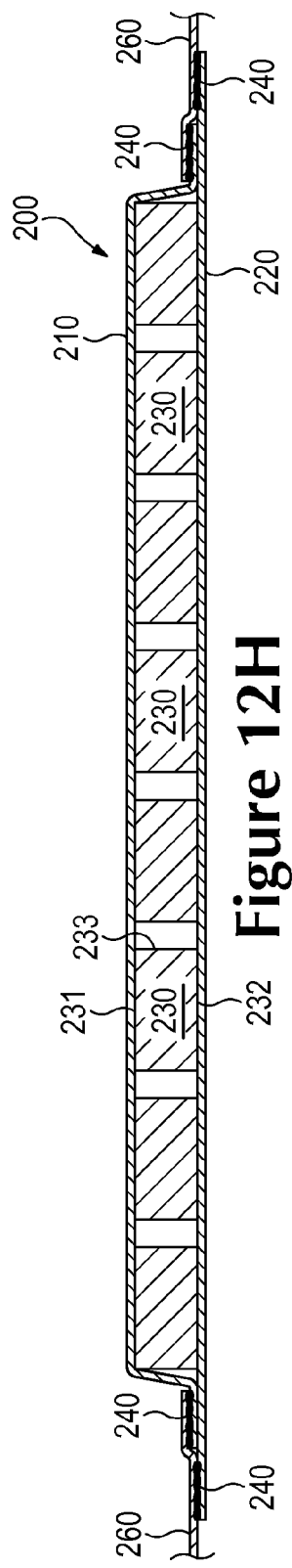

As depicted in FIGS. 1-5B, printed element 100 and cushioning element 200 are distinct. However, various aspects and features of printed element 100 and cushioning element 200 may be intermixed or combined in further configurations. For example, as depicted in FIG. 12D, one or more bonding elements 240 may secure (a) first material layer 110 and first material layer 210 to each other, and (b) first material layer 210 and second material layer 220 to each other. In a further example, as depicted in FIG. 12H, one or more bonding elements 240 have created two regions within cushioning element 200: a first region having first material layer 210, second material layer 220, and pad components 230 located between material layers 210 and 220, and a second region having first material layer 210 and second material layer 220 in a manner substantially similar to printed element 100.

As depicted in FIGS. 1-5B, first material layer 210 is secured to second material layer 220 by bonding element 240. However, in further configurations, other material layers may be secured in various ways to first material layer 210, second material layer 220, or both. More particularly, further configurations may include a base material 260, as depicted in FIGS. 12E-12G. Base material 260 may be a material forming a portion of or substantially all of an article of apparel, and may include any of the various materials discussed above with respect to material layers 110, 120, 210, and 220. Cushioning elements may include base material layer 260 as well as material layers 210 and 220 in a variety of configurations, and may incorporate one or more bonding elements 240 to secure the various layers to each other in a variety of configurations.

For example, as depicted in FIG. 12E, cushioning element 200 may incorporate first material layer 210, second material layer 220, and base material layer 260 extending across second material layer 220. In such a configuration, a bonding element 240 may secure second material layer 220 to base material layer 260. In another example, as depicted in FIG. 12F, cushioning element 200 may incorporate first material layer 210, base material layer 260, pad components 230 located between first material layer 210 and base material layer 260, and second material layer 220 also located between first material layer 210 and base material layer 260. In such a configuration, bonding elements 240 may secure (a) second material layer 220 to first material layer 210 and (b) second material layer 220 to base material layer 260. In a further example, as depicted in FIG. 12G, cushioning element 200 may incorporate first material layer 210, base material layer 260, pad components 230 located between first material layer 210 and base material layer 260, and second material layer 220 having an aperture through which portions of first material layer 210 and pad components 230 extend. In such a configuration, bonding elements 240 may secure (a) second material layer 220 to base material layer 260 and (b) second material layer 220 to first material layer 210.

As depicted in FIGS. 3-5B, cushioning elements 200 may include pad components 230 formed from a polymer foam material. However, in other configurations, cushioning elements 200 may include other pad components. For example, as depicted in FIG. 12I, cushioning component 200 includes fluid-filled chambers 235, each of which has a first surface 236 secured to first material layer 210, a second surface 237 secured to second material layer 220, and a side surface 238 that extends between surfaces 236 and 237. In another example, as depicted in FIG. 12J, cushioning component 200 includes first material layer 210 and fluid-filled chambers 235, but does not include a second material layer 220. In a further example, as depicted in FIG. 12K, printed element 100 is a single fluid-filled chamber 235. In such a configuration, indicia may have been transferred to the components of fluid-filled chamber 235 before the formation of chamber 235, and first surface 236 of fluid-filled chamber 235 may include the indicia.

As depicted in FIGS. 6-10J and as discussed above, the use of dye retention layers in various manufacturing processes may have an advantage of improving the final quality of indicia transferred to the surface of a printed element when the printed element is subjected to a high-temperature thermalbonding step after the indicia has been transferred to it. However, in other manufacturing processes, the use of a dye retention layer may improve the final quality of transferred indicia when the printed element is subjected to other high-temperature steps. For example, dye-retention layers may improve the final quality of transferred indicia when a printed element is subjected to a curing step, or a dehydrating step, or an annealing step.

The invention is disclosed above and in the accompanying Figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing a printed element, comprising:
   printing indicia by dye-sublimation on a first surface of a first material, wherein a second surface of the first material that generally opposes the first surface is to be thermal bonded to a second material after the indicia is printed on the first surface;
   inhibiting transfer of re-sublimated dye away from the first material when the second surface of the first material is thermal bonded to the second material, wherein inhibiting transfer of re-sublimated dye includes positioning a dye-retention layer including a dye-resistant material directly adjacent to the first surface of the first material and the indicia that is printed on the first surface;
   positioning the second surface of the first material adjacent to the second material, such that the first material and the indicia are positioned between the second material and the dye retention layer, the dye-retention layer being positioned directly adjacent to the first surface of the first material on which the indicia is printed and the second material being positioned adjacent the second surface of the first material;
   positioning the dye retention layer between the first material and a heating plate; and
   compressing and heating the first material, the second material, and the dye retention layer to secure the first material to the second material,
   wherein compressing and heating includes securing the first material to the second material by forming at least one polymer bond.

2. The method of claim 1, further comprising a step of receiving an order including data representing the indicia.

3. The method of claim 2, wherein the printing of the indicia by dye-sublimation is done on a surface of the first material according to the data representing the indicia.

4. The method of claim 1, wherein the first material is a polyester mesh material.

5. The method of claim 1, wherein the dye retention layer is selected from a group consisting of a wax paper, a release paper, a polymer sheet, and a material having a plasticized surface.

6. The method of claim 1, wherein the second material is a polymer foam material.

7. The method of claim 1, wherein the step of printing is performed at a first temperature and the step of compressing and heating is performed at a second temperature, the first temperature being greater than the second temperature.

8. The method of claim 7, wherein (a) the first material is a textile material, (b) the dye retention layer is a non-absorbent material, (c) the second material is a polymer foam material.

9. The method of claim 7, wherein the step of compressing and heating includes forming a cushioning component by (a) pressing the dye retention layer against the first material and (b) pressing the first material against the second material.

10. The method of claim 1, further comprising a step of removing the dye retention layer.

11. The method of claim 1, wherein the second material includes a plurality of polymer foam elements.

12. The method of claim 11, wherein the first material is a first textile structure, and the step of positioning includes locating the plurality of polymer foam elements between the first textile structure and a second textile structure.

13. The method of claim 12, wherein at least one of the first textile structure and the second textile structure includes a polymer mesh material.

14. The method of claim 12, wherein the second textile structure includes at least one of a polymer mesh material and a part of a base material of an article of apparel.

15. The method of claim 12, wherein the step of compressing and heating secures the first textile structure to at least one of the second textile structure and the polymer foam elements.

16. The method of claim 12, further comprising steps of (a) removing the dye retention layer and (b) incorporating the first textile structure, the second textile structure, and the polymer foam elements into an article of apparel.

17. A method of manufacturing a printed element, comprising:
   printing indicia by dye-sublimation on a first material;
   inhibiting transfer of re-sublimated dye away from the first material by positioning the first material and the indicia adjacent to a dye-retention layer;
   positioning the first material adjacent to a second material, such that the first material and the indicia are positioned between the second material and the dye retention layer, wherein the dye-retention layer includes a surface to which transfer of a sublimation-printed dye is inhibited and wherein the dye-retention layer is positioned adjacent a surface of the first material on which the indicia is printed and the second material is positioned adjacent an opposite surface;
   positioning the dye retention layer between the first material and a heating plate;
   compressing and heating the first material, the second material, and the dye retention layer to secure the first material to the second material by forming at least one polymer bond; and
   removing the dye retention layer, wherein the step of printing is performed at a first temperature and the step of compressing and heating is performed at a second temperature, the first temperature being greater than the second temperature.

* * * * *